US009478036B2

United States Patent
Putraya et al.

(10) Patent No.: US 9,478,036 B2
(45) Date of Patent: Oct. 25, 2016

(54) METHOD, APPARATUS AND COMPUTER PROGRAM PRODUCT FOR DISPARITY ESTIMATION OF PLENOPTIC IMAGES

(71) Applicant: Nokia Technologies Oy, Espoo (FI)

(72) Inventors: Guruaj Gopal Putraya, Bangalore (IN); Basavaraja S V, Bangalore (IN); Mithun Uliyar, Bangalore (IN); Ravi Shenoy, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 33 days.

(21) Appl. No.: 14/668,055

(22) Filed: Mar. 25, 2015

(65) Prior Publication Data
US 2015/0294472 A1 Oct. 15, 2015

(30) Foreign Application Priority Data

Apr. 14, 2014 (IN) .......................... 1943/CHE/2014

(51) Int. Cl.
*G06K 9/00* (2006.01)
*G06T 7/00* (2006.01)
*H04N 13/02* (2006.01)
*H04N 13/00* (2006.01)

(52) U.S. Cl.
CPC ... *G06T 7/0055* (2013.01); *G06T 2207/10028* (2013.01); *G06T 2207/20228* (2013.01); *H04N 13/0232* (2013.01); *H04N 2013/0081* (2013.01)

(58) Field of Classification Search
CPC .......... G06T 2207/20228; G06T 2207/10028; G06T 7/0055
USPC ........................................................ 382/154
See application file for complete search history.

(56) References Cited

U.S. PATENT DOCUMENTS

| 2007/0133888 | A1  | 6/2007 | Lelescu et al. |
| 2013/0070060 | A1  | 3/2013 | Chatterjee et al. |
| 2013/0120356 | A1* | 5/2013 | Georgiev .............. G06T 15/205 345/419 |
| 2013/0120605 | A1  | 5/2013 | Georgiev et al. |
| 2013/0128081 | A1* | 5/2013 | Georgiev ............. H04N 5/2254 348/240.2 |
| 2013/0242051 | A1* | 9/2013 | Balogh ............ H04N 19/00769 348/43 |

OTHER PUBLICATIONS

Tom E. Bishop,"The Light Field Camera: Extended Depth of Field, Aliasing, and Superresolution",IEEE, May 2012.*

(Continued)

*Primary Examiner* — Stephen R Koziol
*Assistant Examiner* — Shaghayegh Azima
(74) *Attorney, Agent, or Firm* — Nokia Technologies Oy

(57) ABSTRACT

In an example embodiment, a method, apparatus and computer program product are provided. The method includes facilitating receipt of a plenoptic image associated with a scene, the plenoptic image including plenoptic micro-images and being captured by a focused plenoptic camera. The method includes generating plenoptic vectors for the plenoptic micro-images of the plenoptic image, where an individual plenoptic vector is generated for an individual plenoptic micro-image. The method includes assigning disparities for the plenoptic micro-images of the plenoptic image. A disparity for a plenoptic micro-image is assigned by accessing a plurality of subspaces associated with a set of pre-determined disparities, projecting a plenoptic vector for the plenoptic micro-image in the plurality of subspaces, calculating a plurality of residual errors based on projections of the plenoptic vector in the plurality of subspaces, and determining the disparity for the plenoptic micro-image based on a comparison of the plurality of residual errors.

22 Claims, 10 Drawing Sheets

(56) References Cited

OTHER PUBLICATIONS

"Learning Depth in Light Field Images", Research Paper, Retrieved on Sep. 14, 2015, Webpage available at: http://cs229.stanford.edu/proj2005/Johnston-LearningDepthInLightfieldImages.pdf.

Mitra et al., "Light Field Denoising, Light Field Superresolution and Stereo Camera Based Refocussing Using a Gmm Light Field Patch Prior", IEEE Computer Society Conference on Computer Vision and Pattern Recognition Workshops, Jun. 16-21, 2012, 7 pages.

Tao et al., "Depth From Combining Defocus and Correspondence Using Light-Field Cameras", IEEE International Conference on Computer Vision (ICCV), 2013, pp. 673-680.

* cited by examiner

METHOD, APPARATUS AND COMPUTER PROGRAM PRODUCT FOR DISPARITY ESTIMATION OF PLENOPTIC IMAGES

TECHNICAL FIELD

Various implementations relate generally to method, apparatus, and computer program product for disparity estimation of plenoptic images.

BACKGROUND

Various electronic devices, for example, cameras, mobile phones, and other multimedia devices are widely used for capturing image of a scene. Some of these devices also feature a focused plenoptic camera that includes a microlens array in addition to a main lens to capture four-dimensional (4D) plenoptic information (termed as plenoptic images) about the scene. Reconstruction of a plenoptic image that is captured by a plenoptic camera (plenoptic camera 1.0) is performed to estimate depth of a region in the plenoptic image. Depth estimation is useful in post-processing techniques such as refocusing. However, for the focused plenoptic camera (plenoptic camera 2.0) the reconstruction of the plenoptic image has to be done post the depth estimation (or disparity map estimation). Hence for the focused plenoptic camera the depth estimation is of higher importance as compared to the plenoptic camera (the plenoptic camera 1.0).

SUMMARY OF SOME EMBODIMENTS

Various aspects of examples embodiments are set out in the claims.

In a first aspect, there is provided a method comprising: facilitating receipt of a plenoptic image associated with a scene, the plenoptic image including a plurality of plenoptic micro-images and being captured by a focused plenoptic camera; generating a plurality of plenoptic vectors for the plurality of plenoptic micro-images of the plenoptic image, where an individual plenoptic vector of the plurality of plenoptic vectors is generated for an individual plenoptic micro-image of the plurality of plenoptic micro-images; and assigning disparities for the plurality of plenoptic micro-images of the plenoptic image, where a disparity of the disparities for a plenoptic micro-image of the plurality of plenoptic micro-images is assigned by: accessing a plurality of subspaces associated with a set of pre-determined disparities, where a subspace of the plurality of subspaces is associated with a corresponding pre-determined disparity of the set of pre-determined disparities, projecting a plenoptic vector for the plenoptic micro-image in the plurality of subspaces associated with the set of pre-determined disparities, calculating a plurality of residual errors based on projections of the plenoptic vector in the plurality of subspaces, and determining the disparity for the plenoptic micro-image based on a comparison of the plurality of residual errors.

In a second aspect, there is provided an apparatus comprising: at least one processor; and at least one memory comprising computer program code, the at least one memory and the computer program code configured to, with the at least one processor, cause the apparatus to perform at least: facilitate receipt of a plenoptic image associated with a scene, the plenoptic image including a plurality of plenoptic micro-images and being captured by a focused plenoptic camera; generate a plurality of plenoptic vectors for the plurality of plenoptic micro-images of the plenoptic image, where an individual plenoptic vector of the plurality of plenoptic vectors is generated for an individual plenoptic micro-image of the plurality of plenoptic micro-images; and assign disparities for the plurality of plenoptic micro-images of the plenoptic image, where a disparity of the disparities for a plenoptic micro-image of the plurality of plenoptic micro-images is assigned by: accessing a plurality of subspaces associated with a set of pre-determined disparities, where a subspace of the plurality of subspaces is associated with a corresponding pre-determined disparity of the set of pre-determined disparities, projecting a plenoptic vector for the plenoptic micro-image in the plurality of subspaces associated with the set of pre-determined disparities, calculating a plurality of residual errors based on projections of the plenoptic vector in the plurality of subspaces, and determining the disparity for the plenoptic micro-image based on a comparison of the plurality of residual errors.

In a third aspect, there is provided a computer program product comprising at least one computer-readable storage medium, the computer-readable storage medium comprising a set of instructions, which, when executed by one or more processors, cause an apparatus to at least perform: facilitate receipt of a plenoptic image associated with a scene, the plenoptic image including a plurality of plenoptic micro-images and being captured by a focused plenoptic camera; generate a plurality of plenoptic vectors for the plurality of plenoptic micro-images of the plenoptic image, where an individual plenoptic vector of the plurality of plenoptic vectors is generated for an individual plenoptic micro-image of the plurality of plenoptic micro-images; and assign disparities for the plurality of plenoptic micro-images of the plenoptic image, where a disparity of the disparities for a plenoptic micro-image of the plurality of plenoptic micro-images is assigned by: accessing a plurality of subspaces associated with a set of pre-determined disparities, where a subspace of the plurality of subspaces is associated with a corresponding pre-determined disparity of the set of pre-determined disparities, projecting a plenoptic vector for the plenoptic micro-image in the plurality of subspaces associated with the set of pre-determined disparities, calculating a plurality of residual errors based on projections of the plenoptic vector in the plurality of subspaces, and determining the disparity for the plenoptic micro-image based on a comparison of the plurality of residual errors.

In a fourth aspect, there is provided an apparatus comprising: means for facilitating receipt of a plenoptic image associated with a scene, the plenoptic image including a plurality of plenoptic micro-images and being captured by a focused plenoptic camera; means for generating a plurality of plenoptic vectors for the plurality of plenoptic micro-images of the plenoptic image, where an individual plenoptic vector of the plurality of plenoptic vectors is generated for an individual plenoptic micro-image of the plurality of plenoptic micro-images; and means for assigning disparities for the plurality of plenoptic micro-images of the plenoptic image, where a disparity of the disparities for a plenoptic micro-image of the plurality of plenoptic micro-images is assigned by: means for accessing a plurality of subspaces associated with a set of pre-determined disparities, where a subspace of the plurality of subspaces is associated with a corresponding pre-determined disparity of the set of pre-determined disparities, means for projecting a plenoptic vector for the plenoptic micro-image in the plurality of subspaces associated with the set of pre-determined disparities, means for calculating a plurality of residual errors based on projections of the plenoptic vector in the plurality of subspaces, and means for determining the disparity for the plenoptic micro-image based on a comparison of the plurality of residual errors.

In a fifth aspect, there is provided a computer program comprising program instructions which when executed by an apparatus, cause the apparatus to: facilitate receipt of a plenoptic image associated with a scene, the plenoptic image including a plurality of plenoptic micro-images and being captured by a focused plenoptic camera; generate a plurality of plenoptic vectors for the plurality of plenoptic micro-images of the plenoptic image, where an individual plenoptic vector of the plurality of plenoptic vectors is generated for an individual plenoptic micro-image of the plurality of plenoptic micro-images; and assign disparities for the plurality of plenoptic micro-images of the plenoptic image, where a disparity of the disparities for a plenoptic micro-image of the plurality of plenoptic micro-images is assigned by: accessing a plurality of subspaces associated with a set of pre-determined disparities, where a subspace of the plurality of subspaces is associated with a corresponding pre-determined disparity of the set of pre-determined disparities, projecting a plenoptic vector for the plenoptic micro-image in the plurality of subspaces associated with the set of pre-determined disparities, calculating a plurality of residual errors based on projections of the plenoptic vector in the plurality of subspaces, and determining the disparity for the plenoptic micro-image based on a comparison of the plurality of residual errors.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 10 of the drawings.

Figure 1:
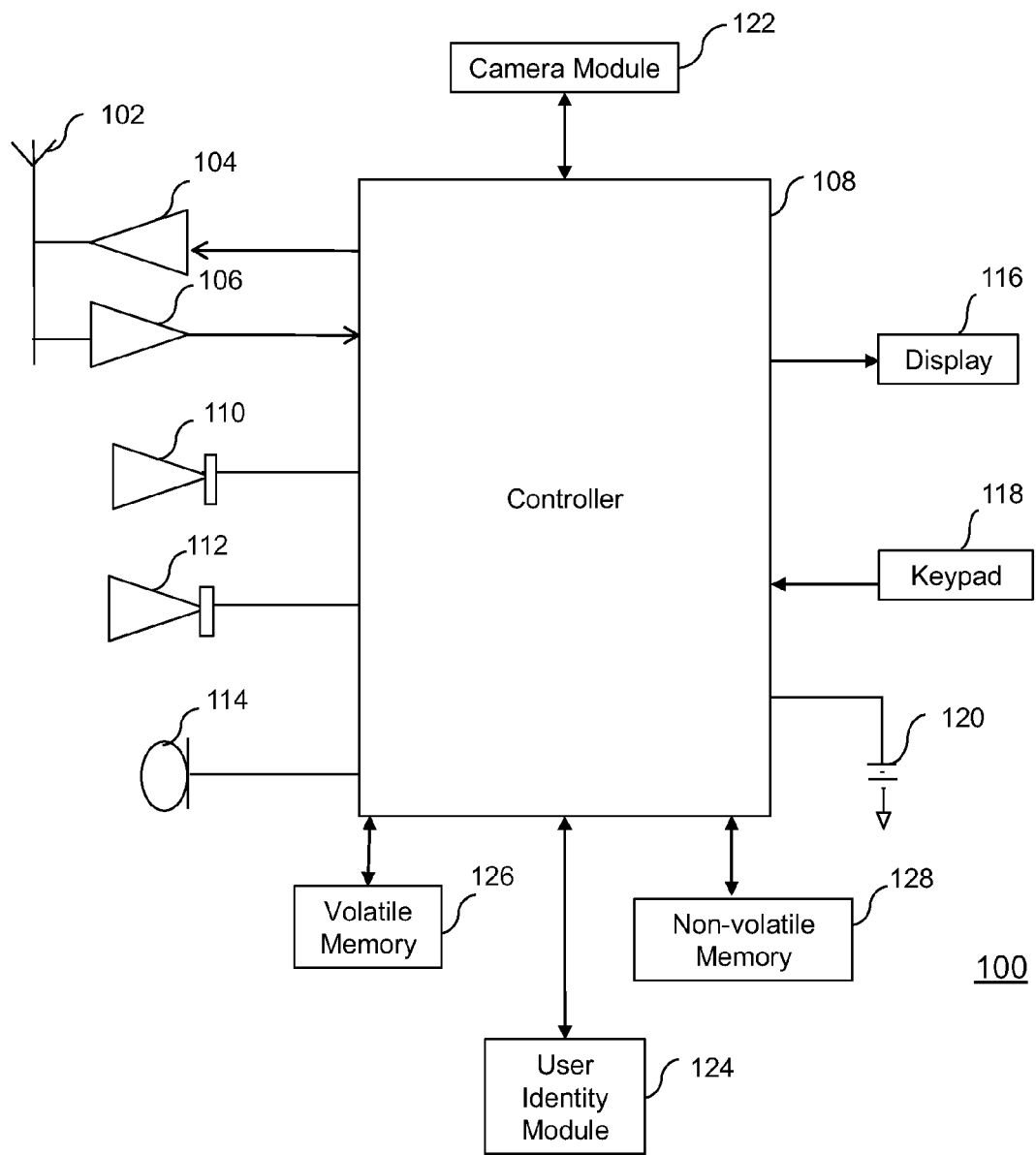
FIG. 1 illustrates a device, in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
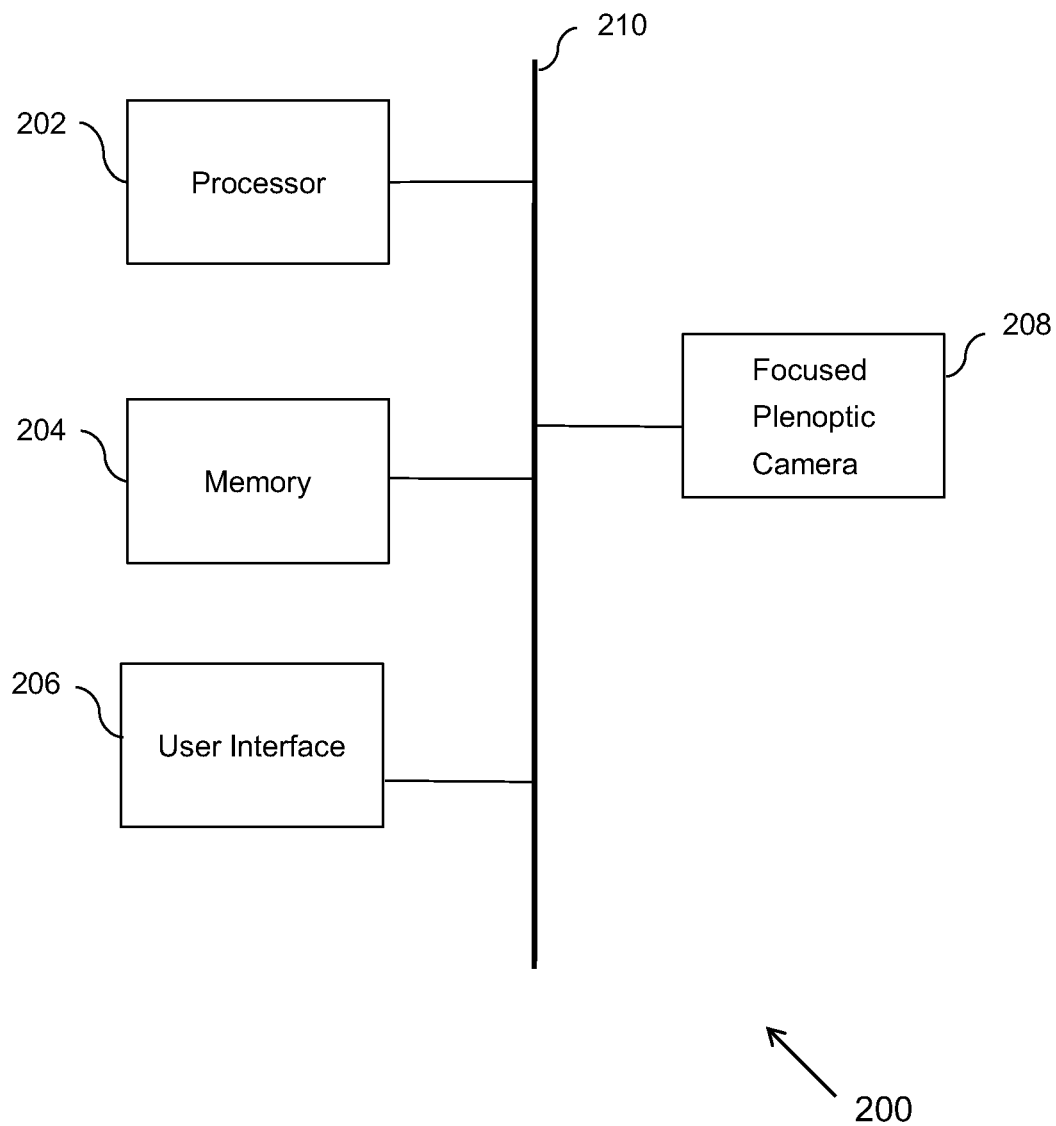
FIG. 2 illustrates an apparatus for disparity estimation of plenoptic images captured from a focused plenoptic camera, in accordance with an example embodiment.

FIG. 2 illustrates an apparatus 200 for disparity estimation of plenoptic images captured from a focused plenoptic camera, in accordance with an example embodiment. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, for example, the device 100 or in a combination of devices. Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory include, but are not limited to, random access memory, dynamic random access memory, static random access memory, and the like. Some examples of the non-volatile memory include, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with or without communication capabilities, computing devices, and the like. Some examples of the electronic device may include a mobile phone, a personal digital assistant (PDA), and the like. Some examples of computing device may include a laptop, a personal computer, and the like. In an example embodiment, the electronic device may include a user interface, for example, the user interface 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface 206 of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus or circuitry to perform the functions of the transceiver. The transceiver may be configured to receive media content. Examples of the media content may include audio content, video content, data, and a combination thereof.

Figure 3:
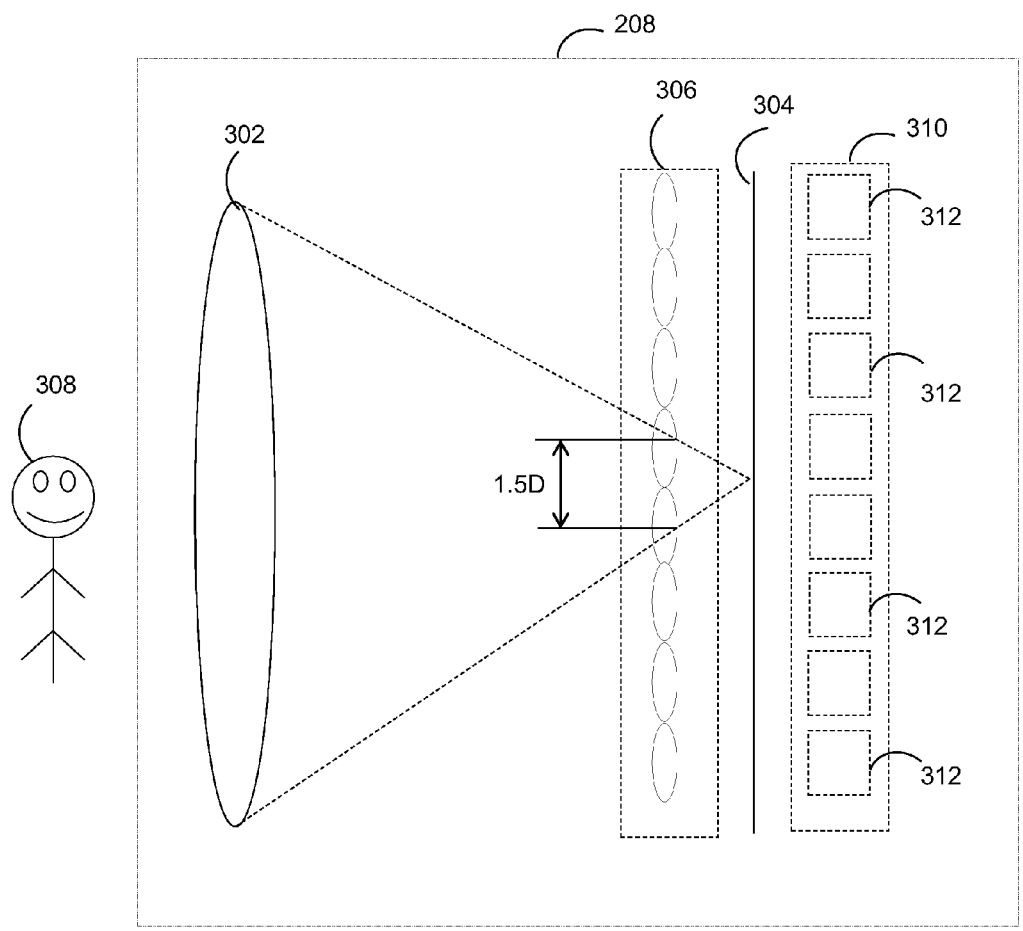
FIG. 3 illustrates an example representation of a focused plenoptic camera.

In an example embodiment, the electronic device may be embodied as to include a focused plenoptic camera 208 (also termed as a light-field camera or plenoptic camera 2.0). In various example embodiments, the focused plenoptic camera 208 is capable of capturing light coming from a scene (also referred to as radiance, light-field or plenoptic function) such that multiple focused views of the scene can be generated from a single image, and various parts of the scene can be refocused after the capture of the image. In an example embodiment, the focused plenoptic camera 208 may include a main lens, a sensor, and a micro-lens array including a plurality of micro-lenses placed between the main lens and the sensor. Each micro-lens in the micro-lens array can be considered as a single camera that projects a portion of an image plane (or a micro-image) onto the sensor. The focused plenoptic camera 208 may be in communication with the processor 202 and/or other components of the apparatus 200. The focused plenoptic camera 208 may be in communication with other imaging circuitries and/or software, and is configured to capture digital images or to make a video or other graphic media files. The focused plenoptic camera 208 and other circuitries, in combination, may be an example of at least one camera module such as the camera module 122 of the device 100. An example representation of the focused plenoptic camera 208 is shown in FIG. 3. The focused plenoptic camera 208 is structurally different from a plenoptic camera 1.0 (a traditional plenoptic camera) with respect to placement of the micro-lens array and focus of the micro-lens array. The plenoptic camera 1.0 focuses a main lens on micro-lenses in a micro-lens array and focuses the micro-lenses at infinity. The focused plenoptic camera 208 focuses the main lens in front of the micro-lenses and focuses the micro-lenses on an image formed inside the focused plenoptic camera 208. The focused plenoptic camera 208 hence generates images of higher spatial resolutions and lower angular resolutions as compared to the plenoptic camera 1.0.

These components (202-208) may communicate to each other via a centralized circuit system 210 to estimate depth in plenoptic images captured by the focused plenoptic camera 208. The centralized circuit system 210 may be various devices configured to, among other things, provide or enable communication between the components (202-208) of the apparatus 200. In certain embodiments, the centralized circuit system 210 may be a central printed circuit board (PCB) such as a motherboard, main board, system board, or logic board. The centralized circuit system 210 may also, or alternatively, include other printed circuit assemblies (PCAs) or communication channel media.

In an example embodiment, the processor 202 is configured to, with the content of the memory 204, and optionally with other components described herein, to cause the apparatus 200 to facilitate receipt of a plenoptic image (I) associated with a scene. Herein, the 'scene' refers to arrangement (natural, manmade, sorted or assorted) of one or more objects of which images or videos can be captured. In an example embodiment, the plenoptic image I may be captured by a focused plenoptic camera (also termed as a light-field camera or a plenoptic camera 2.0) such as the focused plenoptic camera 208. In an example embodiment, the plenoptic image (I) includes a plurality of plenoptic micro-images, where each plenoptic micro-image is captured through a micro-lens of the micro-lens array. Each plenoptic micro-image of the plurality of plenoptic micro-images further includes multiple pixels. The micro-lens array in the focused plenoptic camera 208 may be positioned between the main lens and the sensor of the focused plenoptic camera 208 in order to increase resolution of any captured image by the focused plenoptic camera 208, for example, the plenoptic image I. The micro-lens array includes one of a single-focus micro-lens array and a multi-focus micro-lens array.

In an example embodiment, the plenoptic image I is captured by the focused plenoptic camera 208 that may be present in the apparatus 200. Herein, the 'plenoptic micro-images' refer to images captured by corresponding micro-lenses of the micro-lens array that is present within the focused plenoptic camera 208. In another example embodiment, the apparatus 200 may be caused to send instructions for capturing of the plenoptic image I of the scene by an external focused plenoptic camera that is accessible/communicably coupled to the apparatus 200. Herein, the focused plenoptic camera 208 includes any camera that is capable of capturing plenoptic images of the scene, such that multiple focused views of the same scene may be generated from different viewpoints, and different regions of the plenoptic images may be re-focused after the depth of the plenoptic images are estimated. In some example embodiments, the plenoptic image I may be prerecorded or stored in an apparatus 200, or may be received from sources external to the apparatus 200. In such example embodiments, the apparatus 200 is caused to receive the plenoptic image I from external storage mediums such as DVD, Compact Disk (CD), flash drive, memory card, or from external storage locations through Internet, Bluetooth®, and the like. In an example embodiment, a processing means may be configured to facilitate receipt of the plenoptic image I associated with the scene. An example of the processing means may include the processor 202, which may be an example of the controller 108, and/or the focused plenoptic camera 208.

In an example embodiment, a plurality of plenoptic vectors (V1-Vn) is generated for the plurality of plenoptic micro-images (MI1-MIn) of the plenoptic image I. In an example embodiment, a plenoptic vector of the plurality of plenoptic vectors is generated for a corresponding plenoptic micro-image of the plurality of plenoptic micro-images. For example, if there are 100 plenoptic micro-images in a plenoptic image, 100 corresponding plenoptic vectors may be generated. In an example embodiment, a processing means may be configured to generate the plurality of plenoptic vectors for the plurality of plenoptic micro-images of the plenoptic image I. An example of the processing means may include the processor 202, which may be an example of the controller 108.

In an example embodiment of generating a plenoptic vector for a plenoptic micro-image, the apparatus 200 is caused to select a window of plenoptic micro-images for the plenoptic micro-image. The window of plenoptic micro-images includes the plenoptic micro-image (for which the plenoptic vector is to be generated) and a set of neighboring plenoptic micro-images of the plenoptic micro-image. For example, a plenoptic vector V1 for a plenoptic micro-image MI1 is generated by selecting a 3×3 window of plenoptic micro-images that includes neighboring plenoptic micro-images of the plenoptic micro-image MI1 including the plenoptic micro-image MI1, for example, the set of micro-images includes MI1, MI2, MI3, MI4, MI5, MI6, MI7, MI8, and MI9, where MI2-MI9 are the set of neighboring plenoptic micro-images of the plenoptic micro-image MI1. In an example embodiment, a processing means may be configured to select the window of plenoptic micro-images for the plenoptic micro-image. An example of the processing means may include the processor 202, which may be an example of the controller 108.

In this example embodiment of generating the plenoptic vector for the plenoptic micro-image, the apparatus 200 is caused to select patches of pixels in the window of plenoptic micro-images. An individual patch of pixels of the patches of pixels is selected from an individual plenoptic micro-image of the window of plenoptic micro-images. For example, the plenoptic micro-image MI1 includes a patch of pixels P1 and the set of neighboring plenoptic micro-images MI2-MI9 similarly include patches of pixels P2-P9. In an example, the patches of pixels (hereinafter referred to as patches) are two-dimensional patches. In an example embodiment, each patch of pixels of the patches of pixels may be of size L*L pixels, where L is a length parameter (number of pixels in either height or width of the patch) and is greater than a maximum pre-determined disparity. In an example embodiment, a processing means may be configured to generate the plenoptic vector for the plenoptic micro-image. An example of the processing means may include the processor 202, which may be an example of the controller 108.

In this example embodiment of generating the plenoptic vector for the plenoptic micro-image, the apparatus 200 is caused to linearize the patches into one-dimensional patches. The two-dimensional patches are linearized to one-dimensional patches. For example, the patches P1-P9 are linearized to one-dimensional patches. In this example embodiment of generating the plenoptic vector for the plenoptic micro-image, the apparatus 200 is caused to generate the plenoptic vector for the plenoptic micro-image based on concatenating the one-dimensional patches obtained by linearizing the patches (P1-P9) that are the two-dimensional patches from each corresponding plenoptic micro-image (MI1-MI9). For example, the plenoptic vector V1 for the plenoptic micro-image MI1 is generated based on concatenating the patches P1-P9. In an example embodiment, the patches are concatenated by many suitable techniques known in the state of art. It should be noted that example of nine plenoptic micro-images in the window of plenoptic micro-images of size 3×3 merely serves as an example only and in fact any number of plenoptic micro-images may be included in the window of plenoptic micro-images. In an example embodiment, a processing means may be configured to linearize the patches into one-dimensional patches and generate the plenoptic vector for the plenoptic micro-image based on concatenating the one-dimensional patches. An example of the processing means may include the processor 202, which may be an example of the controller 108.

In an example embodiment, the apparatus 200 is caused to assign disparities for the plurality of plenoptic micro-images of the plenoptic image I. In an example embodiment, a disparity of the disparities for the plenoptic micro-image of the plurality of plenoptic micro-images is assigned by performing steps including: accessing a plurality of subspaces associated with a set of pre-determined disparities; projecting the plenoptic vector for the plenoptic micro-image in the plurality of subspaces associated with the set of pre-determined disparities; calculating a plurality of residual errors based on projections of the plenoptic vector in the plurality of subspaces; and determining the disparity for the plenoptic micro-image based on a comparison of the plurality of residual errors. In an example embodiment, a processing means may be configured to assign disparities for the plurality of plenoptic micro-images of the plenoptic image I. An example of the processing means may include the processor 202, which may be an example of the controller 108.

In this example embodiment of assigning the disparity for the plenoptic micro-image, the apparatus 200 is caused to access the plurality of subspaces associated with the set of pre-determined disparities. In an example embodiment, a subspace of the plurality of subspaces is associated with a corresponding pre-determined disparity of the set of pre-determined disparities. Herein, the "subspace" of a disparity (or appearance space of the disparity) refers to a set of possible images, considered as high dimensional vectors for representing the disparity. For instance, for determining the disparity for the plenoptic micro-image MI1, the apparatus 200 is caused to access a plurality of subspaces S1-Sn associated with a set of pre-determined disparities PD1-PDn and select the disparity from the set of pre-determined disparities PD1-PDn. A subspace S1 is associated with a corresponding pre-determined disparity PD1, subspace S2 is associated with a corresponding pre-determined disparity PD2, and so on. A method of determining the plurality of subspaces is described later and specifically with reference to FIG. 7. In an example embodiment, the plurality of subspaces is trained/pre-configured and stored (for example, at a manufacturing stage) in the memory 204 of the apparatus 200 and is readily available at time of capture of the plenoptic image I. In an example embodiment, a processing means may be configured to access the plurality of subspaces associated with the set of pre-determined disparities. An example of the processing means may include the processor 202, which may be an example of the controller 108.

In this example embodiment of assigning the disparity for the plenoptic micro-image, the apparatus 200 is caused to project the plenoptic vector for the plenoptic micro-image in the plurality of subspaces associated with the set of pre-determined disparities. For instance, the plenoptic vector V1 for the plenoptic micro-image MI1 is projected in the plurality of subspaces S1-Sn. In an example embodiment, a processing means may be configured to project the plenoptic vector for the plenoptic micro-image in the plurality of subspaces associated with the set of pre-determined disparities. An example of the processing means may include the processor 202, which may be an example of the controller 108.

In this example embodiment of assigning the disparity for the plenoptic micro-image, the apparatus 200 is caused to calculate a plurality of residual errors based on projections of the plenoptic vector in the plurality of subspaces. In an example, by projecting the plenoptic vector V1 in the plurality of subspaces S1-Sn, a plurality of residual errors RE1 to REn can be calculated. For instance, a residual error RE1 may be calculated based on projecting the plenoptic vector V1 in the subspace S1, and a residual error RE2 may be calculated based on projecting the plenoptic vector V1 in the subspace S2, and so on. In an example embodiment, a processing means may be configured to calculate a plurality of residual errors based on projections of the plenoptic vector in the plurality of subspaces. An example of the processing means may include the processor 202, which may be an example of the controller 108.

In an example embodiment of calculating the plurality of residual errors, the apparatus 200 is caused to determine a plurality of reconstructed vectors for the plenoptic vector by reconstructing the patches of pixels in the plurality of subspaces. A reconstructed vector of the plurality of reconstructed vectors is determined based on a reconstructed patch of pixels in for a corresponding subspace of the plurality of subspaces. In an example embodiment, the reconstructed vector may be determined based on considering a projection weight as well. A method of determining the projection weight and residual error is described later in detail. For instance, a plurality of reconstructed vectors RV1-RVn is determined for the plenoptic vector V1. The reconstructed vector RV1 is associated with a corresponding subspace S1 and is determined by reconstructing the patch P1 in the subspace S1. In an example embodiment, a processing means may be configured to determine a plurality of reconstructed vectors for the plenoptic vector. An example of the processing means may include the processor 202, which may be an example of the controller 108. In this example embodiment of calculating the plurality of residual errors, the apparatus 200 is caused to determine the plurality of residual errors as corresponding differences between the plurality of reconstructed vectors and the plenoptic vector. For instance, a plurality of residual errors RE1-REn are differences determined between RV1-RVn and the plenoptic vector V1. The residual error RE1 is determined as a difference between RV1 and V1 and so on. In an example embodiment, a processing means may be configured to determine the plurality of residual errors as corresponding differences between the plurality of reconstructed vectors and the plenoptic vector. An example of the processing means may include the processor 202, which may be an example of the controller 108.

In this example embodiment of assigning the disparity for the plenoptic micro-image, the apparatus 200 is caused to determine the disparity for the plenoptic micro-image based on a comparison of the plurality of residual errors. In an example embodiment, a processing means may be configured to determine the disparity for the plenoptic micro-image. An example of the processing means may include the processor 202, which may be an example of the controller 108. In this example embodiment of determining the disparity for the plenoptic micro-image, the apparatus 200 is caused to perform the comparison of the plurality of residual errors (RE1-REn). In an example embodiment, a processing means may be configured to perform the comparison of the plurality of residual errors. An example of the processing means may include the processor 202, which may be an example of the controller 108. In this example embodiment of determining the disparity for the plenoptic micro-image, the apparatus 200 is caused to select the disparity for which a residual error is minimum amongst the plurality of residual errors (RE1-REn). For instance, if a residual error RE5 is minimum amongst the plurality of residual errors RE1-REn then pre-determined disparity PD5 associated with the residual error RE5 is selected as disparity D1 of the plenoptic micro-image MI1. In an example embodiment, a processing means may be configured to select the disparity for which a residual error is minimum amongst the plurality of residual errors. An example of the processing means may include the processor 202, which may be an example of the controller 108.

In an example embodiment, the focused plenoptic camera 208 includes a single-focus micro-lens array of micro-lenses of a single lens type and the apparatus 200 is caused to determine the plurality of subspaces associated with the set of pre-determined disparities. In another example embodiment, the focused plenoptic camera 208 includes a multi-focus micro-lens array of micro-lenses of one or more lens types with corresponding focal lengths and the apparatus 200 is caused to determine the plurality of subspaces by determining one or more subspaces for the one or more lens types for each pre-determined disparity of the set of pre-determined disparities. In an example embodiment, the subspace of the plurality of subspaces for the pre-determined disparity of the set of pre-determined disparities is determined by performing steps including: facilitating receipt of a set of training images, the set of training images including a plurality of training micro-images; generating a first set of training vectors for the plurality of training micro-images of the set of training images; and generating a second set of training vectors by reducing dimensionality of the first set of training vectors. In another example embodiment, the subspace of the plurality of subspaces corresponds to a lens type of the one or more lens types and corresponds to a pre-determined disparity of the set of pre-determined disparities, and the subspace is determined by performing steps including: facilitating receipt of a set of training images, the set of training images including a plurality of training micro-images; generating a first set of training vectors for the plurality of training micro-images of the set of training images; and generating a second set of training vectors by reducing dimensionality of the first set of training vectors. In an example embodiment, a processing means may be configured to determine the plurality of subspaces associated with the set of pre-determined disparities. An example of the processing means may include the processor 202, which may be an example of the controller 108. In this example embodiment of determining the subspace, the apparatus 200 is caused to facilitate receipt of the set of training images (T1-Tn, n being a maximum number of training images). Each of the training images is a plenoptic image including a plurality of training micro-images, and may correspond to a pre-determined disparity of the set of pre-determined disparities. For instance, for each disparity of the set of pre-determined disparities, a set of training images may be accessed to determine the subspace for the each disparity. In an example representation, each training image in the set of training images T1-Tn includes 'm' number of training micro-images represented as TMI1-TMIm. In this example representation, 'n' number of training images in the set of training images T1-Tn include 'm*n' number of training micro-images; and accordingly all training micro-images in the set of training images T1-Tn may be defined as the plurality of training micro-images TMI1-TMImn. The set of training images (T1-Tn) are captured by the focused plenoptic camera 208. Each training image may be an image captured of a different scene with respect to each other. In an example embodiment, content of the set of training images across the set of pre-determined disparities is required to be as similar as possible such that training vectors generated are also similar. In an example embodiment, a processing means may be configured to facilitate receipt of the set of training images (T1-Tn). An example of the processing means may include the processor 202, which may be an example of the controller 108, and/or the focused plenoptic camera 208.

In an example embodiment, one can also filter the number of training micro-images under each training images of the set of training images (T1-Tn) based on some criteria. For example, based on a variance in a center micro-image (that is, only if the variance is above a threshold then the micro-image is considered for training the subspace). In such a case there could be '$m_1$' number of micro-images for the training image T1, represented as TMI1-TMIm$_1$. Similarly for training image T2, there could be '$m_2$' training micro-images, represented as TMI1-TMIm$_2$ and so on. For training image Tn, there could be '$m_n$' training micro-images, represented as TMI1-TMIm$_n$. Hence total training micro-images for the training of a particular disparity would then be ($m_1+m_2+ \ldots +m_n$).

In this example embodiment of determining the subspace for the pre-determined disparity (for example, PD1), the apparatus 200 is caused to generate the first set of training vectors for the plurality of training micro-images (TMI1-TMImn) of the set of training images (T1-Tn) corresponding to the pre-determined disparity PD1. In an example embodiment, each training image in the set of training images T1-Tn includes 'm' number of training vectors and is defined as TV1-TVm that correspond to the training micro-images TMI1-TMIm. In an example embodiment, 'n' number of training images in the set of training images T1-Tn include 'm*n' number of training vectors and may be defined as the first set of training vectors TV1-TVmn that correspond to the plurality of training micro-images TMI1-TMImn. A training vector of the first set of training vectors is associated with a training micro-image of the plurality of training micro-images and is determined by performing steps including selecting a window of training micro-images for the training micro-image; selecting patches of pixels in the window of training micro-images; linearizing the patches of pixels into one-dimensional patches of pixels; and generating the training vector for the training micro-image based on concatenating the one-dimensional patches of pixels. For instance, a training vector TV1 is associated with a training micro-image TMI1, and a training vector TVm is associated with a training micro-image TMIm. In an example embodiment, a processing means may be configured to generate the first set of training vectors. An example of the processing means may include the processor 202, which may be an example of the controller 108.

In an example embodiment of generating the training vector for a training micro-image, the apparatus 200 is caused to select the window of training micro-images for the training micro-image. The window of training micro-images includes the training micro-image and a set of neighboring training micro-images of the training micro-image. For example, for a training image including 16 micro-images, a training vector TV6 for a training micro-image TMI6 is generated by first selecting the window of training micro-images of size 3×3 including TMI1, TMI2, TMI3, TMI5, TMI6, TMI7, TMI9, TMI10, and TMI11, where TMI1, TMI2, TMI3, TMI5, TMI7, TMI9, TMI10, and TMI11 are the set of neighboring training micro-images of the training micro-image TMI6. In an example embodiment, a processing means may be configured to select a window of training micro-images for the training micro-image. An example of the processing means may include the processor 202, which may be an example of the controller 108.

In this example embodiment of generating the training vector for the training micro-image, the apparatus 200 is caused to select the patches of pixels in the window of training micro-images. An individual patch of pixels of the patches of pixels is selected from an individual training micro-image of the window of training micro-images and has its length parameter greater than the maximum pre-determined disparity in the set of pre-determined disparities (PD1-PDn). For example, the training micro-image TMI6 includes a two-dimensional patch of pixels (PP6) and the set of neighboring training micro-images TMI1, TMI2, TMI3, TMI5, TMI7, TMI9, TMI10, and TMI11 similarly include patches of pixels PP1, PP2, PP3, PP5, PP7, PP9, PP10, and PP11, respectively. In an example embodiment, a patch of size L×L can be selected where L is a length parameter greater than the maximum pre-determined disparity (PDn). In an example embodiment, a processing means may be configured to select patches of pixels in the window of training micro-images. An example of the processing means may include the processor 202, which may be an example of the controller 108.

In this example embodiment of generating the training vector for the training micro-image, the apparatus 200 is caused to linearize the patches into one-dimensional patches. The patches are linearized from the two-dimensional patches to one-dimensional patches. For example, the patches PP1, PP2, PP3, PP5, PP6, PP7, PP9, PP10, and PP11 are linearized to the one-dimensional patches. In this example embodiment of generating the training vector for the training micro-image, the apparatus 200 is caused to generate the training vector for the training micro-image based on concatenating the one-dimensional patches. For example, the training vector TV6 for the training micro-image TMI6 is generated by concatenating the patches PP1, PP2, PP3, PP5, PP6, PP7, PP9, PP10, and PP11. It should be noted that example of nine training micro-images in the window of training micro-images of size 3×3 merely serves as an example only and in fact any number of training micro-images may be included in the window of training micro-images. In an example embodiment, a processing means may be configured to linearize the patches into one-dimensional patches and generate the training vector for the training micro-image based on concatenating the one-dimensional patches. An example of the processing means may include the processor 202, which may be an example of the controller 108. It should be noted that in similar manner of the generation of the training vector TV6, as described above, other training vectors (other than TV6) of the first set of training vectors (TV1-TVmn) for other training micro-images (other than TMI6) in the plurality of training micro-images (TMI1-TMImn) may also be generated.

In the example embodiment of determining the subspace for the pre-determined disparity (for example, PD1), the apparatus 200 is caused to generate a second set of training vectors by reducing dimensionality of the first set of training vectors (TV1-TVmn) based on a classification method. Examples of the classification method for reducing the dimensionality of the first set of training vectors include, but are not limited to principal component analysis (PCA), a combination of PCA and linear discriminant analysis (LDA), support vector machine (SVM) and neural networks. In an example embodiment, the second set of training vectors (TV1-TVd, where d corresponds to a reduced set of dimension that is chosen, for example in PCA these are the eigenvectors obtained by using the first of set of training vectors TV1-TVmn) is a reduced set of training vectors filtered from the first set of training vectors (TV1-TVmn), and where the second set of training vectors (TV1-TVd) corresponds to the subspace for the pre-determined disparity. For instance, the second set of training vectors (TV1-TVd) represents the subspace (S1) for the corresponding pre-determined disparity (PD1). In an example embodiment, a processing means may be configured to generate the second set of training vectors. An example of the processing means may include the processor 202, which may be an example of the controller 108.

It should be noted that in similar manner of the determination of the subspace S1 for the corresponding pre-determined disparity (PD1), as described above, other subspaces of the plurality of subspaces (S2-Sn) for the other pre-determined disparities (PD2-PDn, respectively) may also be generated.

In an example embodiment, a subspace Si of the subspaces (S1-Sn) is represented by a vector matrix U(i), where i=1, 2, . . . n corresponding to 'n' subspaces. The vector matrix U(i) represents the second set of training vectors (TV1-TVd) that are eigenvectors of the subspace Si (in case of PCA). In an example embodiment, projection weights for a plenoptic vector, for example the plenoptic vector V1 in each of the subspace is obtained by projecting the vector V1 onto each of the subspaces (S1-Sn). For example, a projection weight (projWeight(i)) obtained by projecting the plenoptic vector V1 onto the subspace S(i) may be determined as per the following equation (1):

$$\text{projWeight}(i) = U(i)^T * (V1 - m(i)) \qquad (1)$$

where U(i) is the vector matrix formed by the second set of training vectors for the subspace Si, $U(i)^T$ is a transpose of the vector matrix U(i), and m(i) is a mean vector corresponding to the subspace Si.

In an example embodiment, a reconstructed vector RV(i) corresponding to the subspace Si may be generated as per the following equation (2):

$$RV(i) = U(i) * \text{projWeight}(i) \qquad (2)$$

In an example embodiment, a residual error RE(i) is subsequently determined from a difference between the reconstructed vector RV(i) and a difference between the plenoptic vector and the mean vector m(i). The residual error RE(i) is further calculated as per the following equation (3):

$$RE(i) = \|(V1 - m(i)) - RV(i)\| \qquad (3)$$

where $\|(.)\|$ is an operator norm. In an example embodiment, based on a least residual error, a disparity is determined for the plenoptic micro-image associated with the plenoptic vector V1. Similarly, disparities are determined for other plenoptic micro-images associated with the plenoptic vectors (V2-Vn).

FIG. 3 represents an example representation of the focused plenoptic camera 208. The focused plenoptic camera 208 includes a main lens 302, a sensor 304 and a micro-lens array 306 positioned between the main lens 302 and the sensor 304 based on a Galilean arrangement. Light is collected at the sensor 304 from various angles through the micro-lens array 306. In various scenarios, several images of portions of an object 308 (example of a scene) present in front of the focused plenoptic camera 208 are generated by the micro-lens array 306 onto the sensor 304. In an example, several micro-lenses of the micro-lens array 306 project a beam approaching from the main lens 302 onto different parts of the sensor 304 thereby creating multiple instances of an object point (belonging to the object 308) onto multiple locations of the sensor 304. For instance, the micro-lens array 306 is capable of generating a plenoptic image 310 corresponding to the object 308. In an example embodiment, the plenoptic image 310 may be stored in the memory 204, or any other storage location embodied in the apparatus 200 or otherwise accessible to the apparatus 200. It should be noted that the plenoptic image 310 includes a plurality of micro-images (for example, shown by 312), where each micro-image may include a plurality of pixels or image information for at least a portion of the object 308.

The micro-lens array 306 is placed such that it focuses at an imaging plane of the main lens 302 and is positioned between the main lens 302 and the sensor 304 such that resolution of the plenoptic image 310 is increased. In an example embodiment, the micro-lens array 306 is positioned closer to the sensor 304 in the focused plenoptic camera 208 than in traditional focused plenoptic cameras (having either a multi-focus micro-lens array or a single-focus micro-lens array). It should be noted that by such positioning of the micro-lens array 306, depth of a micro-image can be estimated even without presence of at least one sharp copy of a patch of the micro-image in a set of neighboring micro-images. In an example embodiment, the micro-lens array 306 may include micro-lenses of same lens type having same focal lengths. In another example embodiment, the micro-lens array 306 may include micro-lenses of one or more lens types having one or more focal lengths. In an example embodiment, the micro-lens array 306 enables a cone of rays from the main lens 302 to occupy 1.5 micro-lenses (or 1.5 D, where D is micro-lens array pitch in millimeter) of the micro-lens array 306 as compared to 2 micro-lenses (or 2 D) in the traditional focused plenoptic cameras. The resolution of the plenoptic image 310 is hence increased by positioning of the micro-lens array 306 in the proposed manner. However, such positioning of the micro-lens array 306 should not be considered as limiting to the scope of various example embodiments.

In an example embodiment, disparities for the micro-images 312 (present in the plenoptic image 310) are determined for estimating the disparity map/depth map for the plenoptic image 310. In an example embodiment, the disparity of each micro-image is determined by generating plenoptic vectors corresponding to the micro-images and projecting the plenoptic vectors in subspaces for various pre-determined disparities. An example representation of generating plenoptic vectors is shown in FIG. 4.

Figure 4:
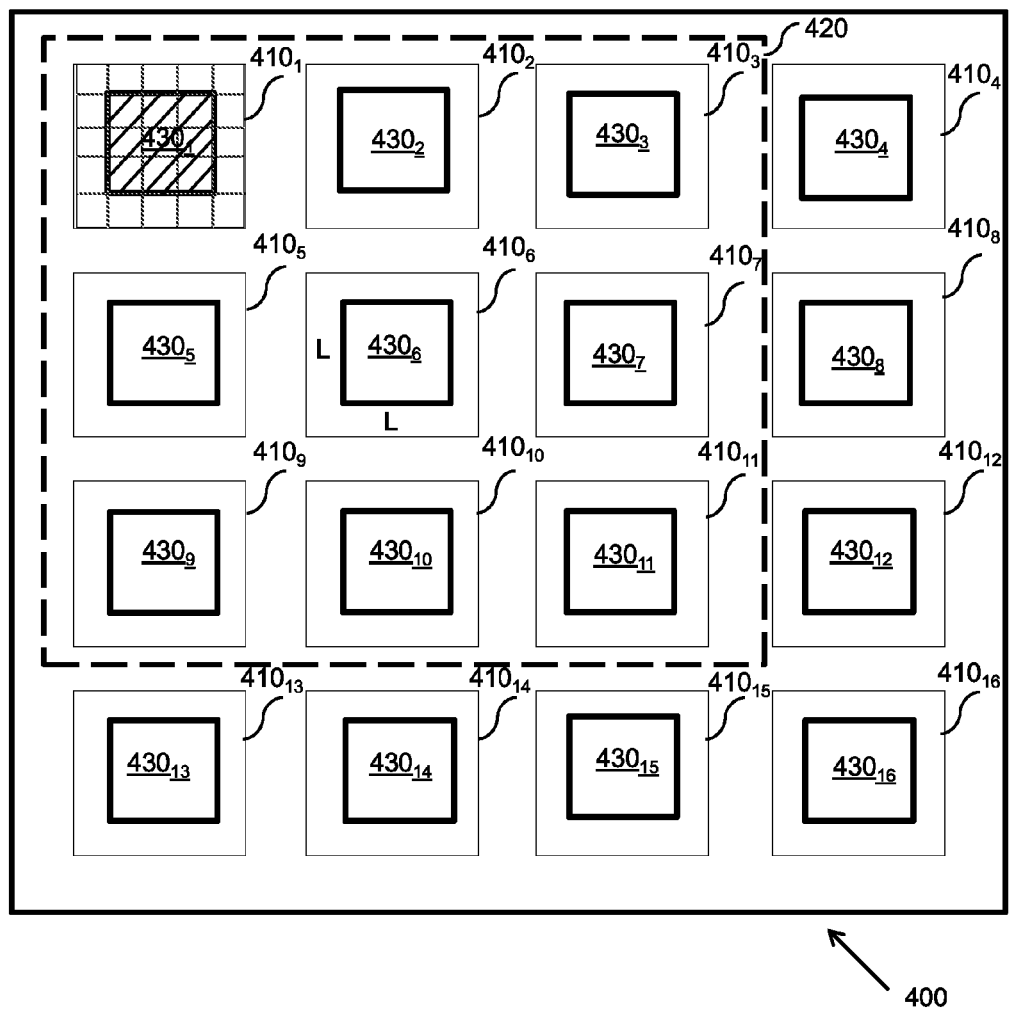
FIG. 4 illustrates an example representation of a plenoptic image for generation of plenoptic vectors, in accordance with an example embodiment.

FIG. 4 illustrates an example representation of a plenoptic image 400 for generation of plenoptic vectors, in accordance with an example embodiment. It should be noted that the plenoptic image 400 and plenoptic micro-images in the plenoptic image 400 (an example of the plenoptic image 310) are shown for representation purposes only so as to explain the generation of plenoptic vectors. The plenoptic image 400 is captured by the focused plenoptic camera 208 and includes a plurality of plenoptic micro-images formed on the sensor 304. An example representation of some of the plenoptic micro-images is shown by $410_1$, $410_2$, $410_3$ ... $410_{16}$. For each plenoptic micro-image, a plenoptic vector is generated. Each of the plenoptic micro-images ($410_1$, $410_2$, $410_3$ ... $410_{16}$) includes a plurality of pixels. In this example representation, the micro-image $410_1$ is shown as including 5*5 pixels (total of 25 pixels) for example purposes only, and similarly other micro-images, though not shown, but may be assumed to include 5*5 pixels. For example, for generating a plenoptic vector for a plenoptic micro-image, for example a plenoptic micro-image $410_6$, a window around the plenoptic micro-image $410_6$ is determined. For example, for generating a plenoptic vector V6 for the plenoptic micro-image $410_6$, a window of plenoptic micro-images (shown by 420) of a size 3×3 micro-images is selected. The window of plenoptic micro-images 420 includes the plenoptic micro-image $410_6$ along with a set of neighboring plenoptic micro-images $410_1$, $410_2$, $410_3$, $410_5$, $410_7$, $410_9$, $410_{10}$, $410_{11}$.

In this example of determining the plenoptic vector V6 for the plenoptic micro-image $410_6$, patches of pixels in the micro-images of the window of plenoptic micro-images 420 are selected. An example representation of the patches of pixels is shown by $430_1$, $430_2$, $430_3$ ... $430_{16}$. In an example embodiment, 3×3 pixels are selected as a patch of pixels (shown by $430_1$) out of 5×5 pixels in the plenoptic micro-image $410_1$. Similarly, other patches of pixels may be selected in their respective micro-images, and are shown by reference numerals $430_2$, $430_3$ ... $430_{16}$ for representation purposes only. In an example embodiment, each patch of pixels is of size L*L where L is a length parameter that is greater than a maximum pre-determined disparity in the set of pre-determined disparities (PD1-PDn). In an example, the patches of pixels $430_1$, $430_2$, $430_3$, $430_5$, $430_6$, $430_7$, $430_9$, $430_{10}$ and $430_{11}$ are two-dimensional patches that are selected from the window of plenoptic micro-images 420. Each patch of pixels is linearized to one-dimensional patches of length $L*L=L^2$. Similarly, all the patches of pixels in the window of plenoptic micro-images 420 are linearized to one-dimensional patches and then concatenated to generate the plenoptic vector for the plenoptic micro-image. In an example, the patches of pixels $430_1$, $430_2$, $430_3$, $430_5$, $430_6$, $430_7$, $430_9$, $430_{10}$, $430_{11}$, are linearized to one-dimensional patches and concatenated to generate the plenoptic vector V6 for the plenoptic micro-image $410_6$. On concatenating the patches of pixels in the window of plenoptic micro-images 420, the plenoptic vector V6 that is generated has a dimension of $9*L*L=9L^2$, where 9 is a number of plenoptic micro-images in the window of plenoptic micro-images 420. In a similar manner, remaining plenoptic vectors (V1-V5, V7-V16) corresponding to the plenoptic micro-images ($410_1$-$410_5$, $410_7$-$410_{16}$, respectively) in the plenoptic image 400 are generated. For corner plenoptic micro-images such as $410_1$, $410_2$, $410_3$, $410_4$, $410_5$, $410_8$, $410_9$, $410_{12}$, $410_{13}$, $410_{14}$, $410_{15}$, and $410_{16}$, a window of plenoptic micro-images of the size 3×3 may not be selected, and in such instances, a least plenoptic vector of the plenoptic vectors belonging to surrounding plenoptic micro-images can be assigned as a plenoptic vector of a corresponding corner plenoptic micro-image.

Once the plenoptic vectors are generated for the plurality of plenoptic micro-images of the plenoptic image, disparities are assigned for the plurality of plenoptic micro-images of the plenoptic image. To assign the disparities, a plurality of subspaces associated with the set of pre-determined disparities is first accessed. The plurality of subspaces are determined (a one-time determination) and stored in the focused plenoptic camera 208 for disparity estimation and are determined by generating training vectors. An example representation of a set of training images for generation of the training vectors is shown in FIG. 5.

Figure 5:
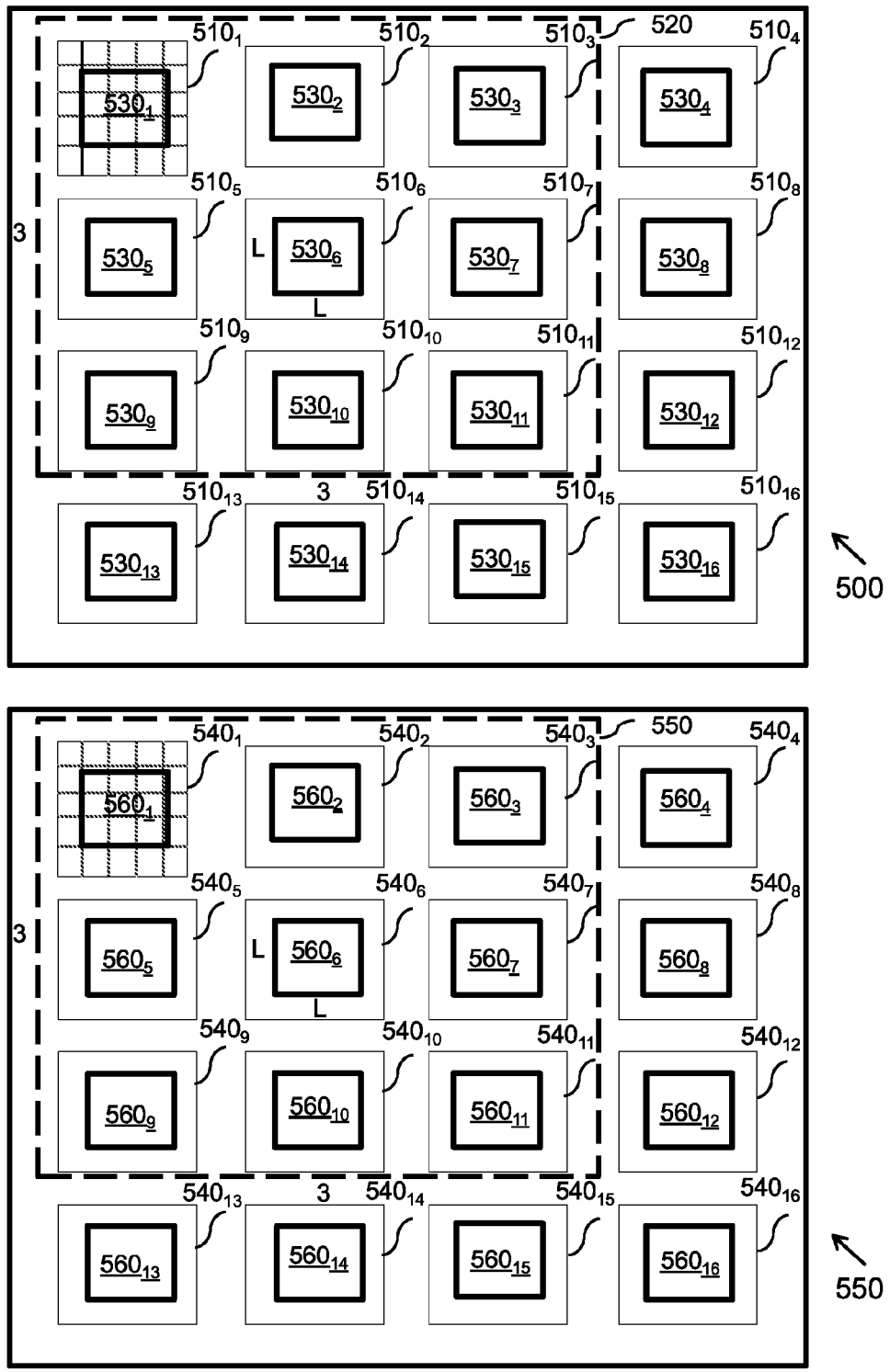
FIG. 5 illustrates an example representation of a set of training images for generation of training vectors, in accordance with an example embodiment.

FIG. 5 illustrates an example representation of a set of training images, for example training image 500 and a training image 550 for generation of a training vector in accordance with an example embodiment. It should be noted that for each pre-determined disparity and each corresponding subspace, a set of training images may be accessed. In an example embodiment, the set of training images are plenoptic images captured by the focused plenoptic camera. In an example, the set of training images, for example, the training images 500 and 550 correspond to the pre-determined disparity but may be the images captured of different scenes. It should be noted that the training images 500 and 550 and training micro-images in the training images 500 and 550 are shown for representation purposes only so as to explain the generation of training vectors. Each of the training images 500 and 550 includes training micro-images formed on the sensor 304. An example representation of the training micro-images in the training image 500 is shown by $510_1, 510_2, 510_3 \ldots 510_{16}$ and in the training image 550 is shown by $540_1, 540_2, 540_3 \ldots 540_{16}$. In an example embodiment, for each training micro-image, a training vector is generated. In this example representation, each of the training micro-images are shown as including 5*5 pixels (total of 25 pixels) for example purposes only. For example, for generating a training vector for a training micro-image, for example a training micro-image $510_6$, a window around the training micro-image $510_6$ is determined. For example, for generating a training vector TV6 for the training micro-image $510_6$, a window of training micro-images 520 of a size 3×3 is selected. The window of training micro-images 520 includes the training micro-image $510_6$ along with a set of neighboring training micro-images $510_1, 510_2, 510_3, 510_5, 510_7, 510_9, 510_{10}$ and $510_{11}$.

In an example embodiment, patches of pixels in the training micro-images of the window of training micro-images 520 are selected. An example representation of the patches of pixels is shown by $530_1, 530_2, 530_3 \ldots 530_{16}$. In an example embodiment, 3×3 pixels are selected as a patch of pixels $530_1$ out of 5×5 pixels in the training micro-image $510_1$. Similarly, other patches of pixels $530_2, 530_3 \ldots 530_{16}$ are also selected. Reference numerals for the patches $530_1, 530_2, 530_3 \ldots 530_{16}$ are provided in FIG. 5 for the representation purposes only. In an example embodiment, each patch of pixels is of size L*L where L is a length parameter that is greater than a maximum pre-determined disparity in the set of pre-determined disparities (PD1-PDn). In an example, the patches of pixels $530_1, 530_2, 530_3, 530_5, 530_6, 530_7, 530_9, 530_{10}, 530_{11}$, are two-dimensional patches that are selected from the window of training micro-images 520. Each patch of pixels is linearized to one-dimensional patches of length $L*L=L^2$. Similarly, all the patches of pixels in the window of training micro-images 520 are linearized to one-dimensional patches and then concatenated to generate the training vector for the training micro-image $530_6$. In an example, the patches of pixels $530_1, 530_2, 530_3, 530_5, 530_6, 530_7, 530_9, 530_{10}, 530_{11}$, are linearized to one-dimensional patches and concatenated to generate the training vector TV6 for the training micro-image $510_6$. On concatenating the patches of pixels in the window of training micro-images 520, the training vector TV6 that is generated has a dimension of $9*L*L=9L^2$, where 9 is a number of training micro-images in the window of training micro-images 520. In a similar manner, remaining training vectors (other than TV6) corresponding to the training micro-images ($510_1$-$510_5$, $510_7$-$510_{16}$) in the training image 500 are generated. For corner training micro-images such as $510_1, 510_2, 510_3, 510_4, 510_5, 510_8, 510_9, 510_{12}, 510_{13}, 510_{14}, 510_{15}$, and $510_{16}$, a window of training micro-images of the size 3×3 cannot be selected and in such instances, a least plenoptic vector of the plenoptic vectors belonging to surrounding training micro-images can be assigned as a plenoptic vector of a corresponding corner training micro-image.

In an example embodiment, the training vectors corresponding to the training micro-images in the training image 550 are also generated. For example, for generating a training vector for a training micro-image, for example a training micro-image 5406, a window around the training micro-image $540_6$ is determined. For example, for generating a training vector for the training micro-image $540_6$, a window of training micro-images 550 (of a size of 3×3 micro-images) is selected. In an example embodiment, patches of pixels ($560_1, 560_2, 560_3, 560_5, 560_6, 560_7, 560_9, 560_{10}, 560_{11}$) in corresponding training micro-images of the window of training micro-images 520 are selected, linearized and concatenated. For corner training micro-images such as $540_1, 540_2, 540_3, 540_4, 540_5, 540_8, 540_9, 540_{12}, 540_{13}, 540_{14}, 540_{15}$, and $540_{16}$, a window of training micro-images of the size 3×3 cannot be selected and in such instances, a least plenoptic vector of the plenoptic vectors belonging to surrounding training micro-images can be assigned as a plenoptic vector of a corresponding corner training micro-image. The training vectors from both the training images 500 and 550 together form a first set of training vectors. The first set of training vectors are reduced in dimensionality by a classification method, for example PCA, PCA and LDA, and SVM, to generate a second set of training vectors. The second set of training vectors is a reduced (in dimension) set of vectors as compared to the first set of training vectors. The second set of training vectors forms a subspace for a predetermined disparity, for example a subspace S1 for the pre-determined disparity PD1. The subspaces S2-Sn of the plurality of subspaces are hence determined similarly for corresponding pre-determined disparities PD2-PDn, respectively, and stored in the focused plenoptic camera 208, for example in the memory 204.

For assigning a disparity to a plenoptic micro-image of the plenoptic image, the subspaces S1-Sn are first accessed. The plenoptic vector corresponding to the plenoptic micro-image is projected in the plurality of subspaces S1-Sn. Residual errors are calculated for the plenoptic vector by determining differences between reconstructed vectors for corresponding subspaces and the plenoptic vector. On performing a comparison of the residual errors of the plenoptic vector, a residual error that is minimum is determined and pre-determined disparity of the corresponding subspace is assigned as the disparity for the plenoptic micro-image. Similarly, remaining disparities of the plenoptic micro-images are assigned to enable disparity estimation of the plenoptic image.

It should be noted that FIGS. 4 and 5 are provided for the representation of an example only, and should not be considered limiting to the scope of the various example embodiments. It should be noted that depth maps generated during the disparity estimation using above methods in the focused plenoptic camera 208 provide better refocusing or reconstruction as compared to depth maps generated using prior methods, for example a multi-baseline method, in the plenoptic camera 1.0. The depth maps further provide identification of depth regions that are beyond a depth of interest, and identification of plane regions in the plenoptic image. The disparity estimation is further robust even if the plenoptic image is a noisy image.

Figure 6:
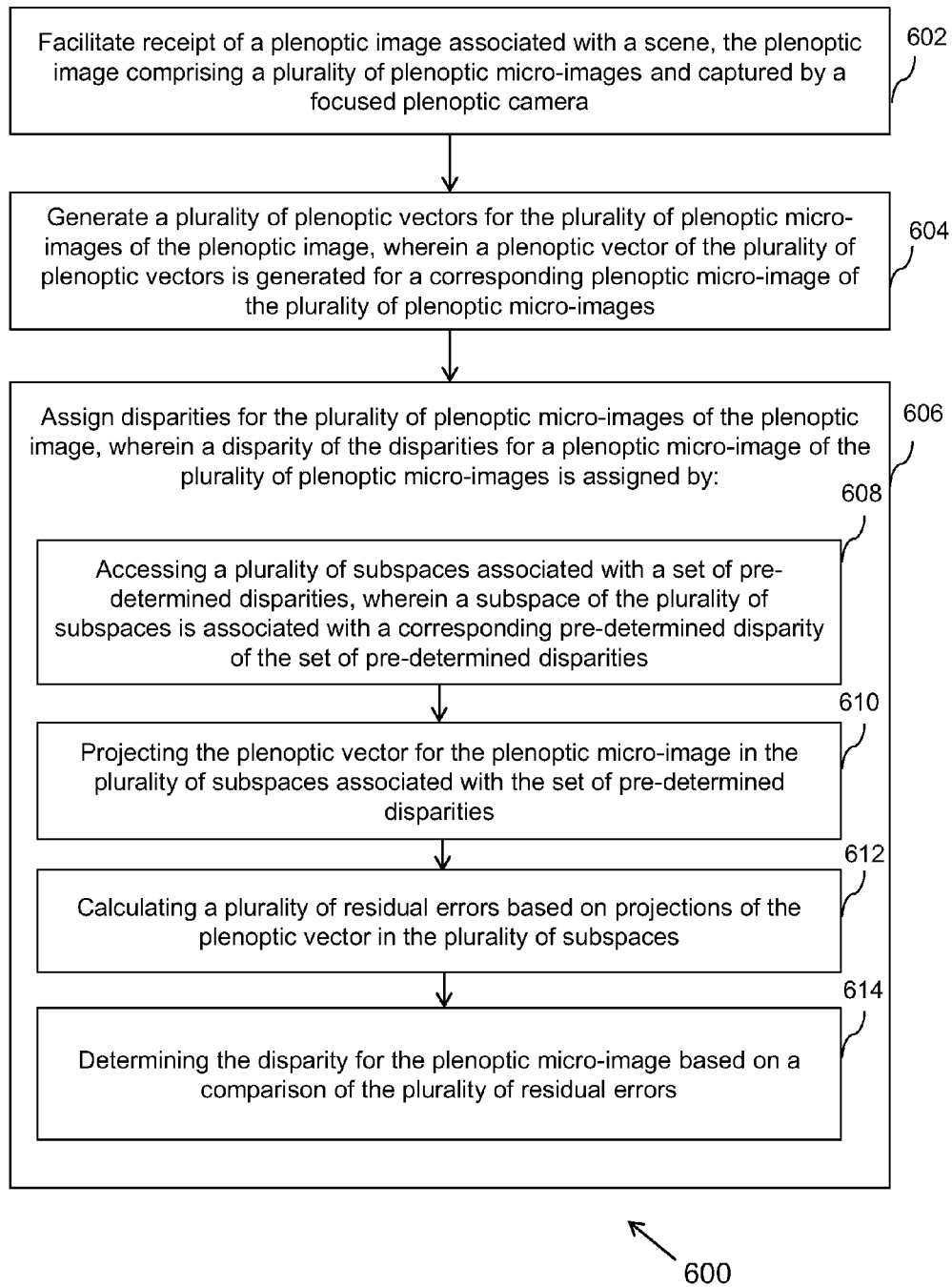
FIG. 6 is a flowchart depicting an example method for assigning disparities to plenoptic micro-images of a plenoptic image, in accordance with an example embodiment.

FIG. 6 is a flowchart depicting an example method for assigning disparities to plenoptic micro-images of a plenoptic image, in accordance with an example embodiment. For example, FIG. 6 illustrates a flowchart depicting an example method 600 for assigning disparities (D1-Dn) to plenoptic micro-images (MI1-MIn) of a plenoptic image (I), in accordance with another example embodiment. Example references are made to FIGS. 2 to 5 for the description of the method 600. The method 600 depicted in the flowchart may be executed by, for example, the apparatus 200 of FIG. 2.

At 602, the method 600 includes facilitating receipt of a plenoptic image (I) associated with a scene. In an example embodiment, the plenoptic image includes a plurality of plenoptic micro-images (MI1-MIn) and is captured by a focused plenoptic camera present in or otherwise accessible to the apparatus 200. In an example embodiment, the focused plenoptic camera includes a micro-lens array positioned between a main lens and a sensor of the focused plenoptic camera as shown in FIG. 3 where the micro-lens array is placed closer to the sensor compared to a conventional placement of the micro-lens array (either a multi-focus micro-lens array or a single-focus micro-lens array) in the focused plenoptic camera to increase resolution of the plenoptic image (I).

At 604 the method 600 includes generating a plurality of plenoptic vectors (V1-Vn) for the plurality of plenoptic micro-images of the plenoptic image. In an example embodiment, a plenoptic vector (V1) of the plurality of plenoptic vectors is generated for a corresponding plenoptic micro-image, for example, plenoptic micro-image MI1 of the plurality of plenoptic micro-images (MI1-MIn).

In an example embodiment, the plenoptic vector (V1) is generated by performing steps of selecting a window of plenoptic micro-images for the plenoptic micro-image (MI1), where the window of plenoptic micro-images includes the plenoptic micro-image (MI1) and a set of neighboring plenoptic micro-images of the plenoptic micro-image (MI1). In this example embodiment of generating the plenoptic vector (V1), the method 600 includes selecting patches of pixels in the window of plenoptic micro-images, where an individual patch of pixels of the patches of pixels is selected from an individual plenoptic micro-image of the window of plenoptic micro-images. In this example embodiment of generating the plenoptic vector (V1), the method 600 includes linearizing the patches of pixels into one-dimensional patches of pixels, and generating the plenoptic vector (V1) for the plenoptic micro-image (MI1) based on concatenating the one-dimensional patches of pixels.

In an example embodiment, the individual patch of pixels is selected such that a length parameter (for example, height or width of the patch) of the individual patch of pixels is greater than a maximum pre-determined disparity in the set of pre-determined disparities.

At 606, the method 600 includes assigning disparities (D1-Dn) for the plurality of plenoptic micro-images of the plenoptic image. In an example embodiment, a disparity, for example, the disparity (D1) for a plenoptic micro-image (MI1) of the plurality of plenoptic micro-images is assigned by performing 620, 625, 630, and 635, and the same operations may be executed for assigning disparities (D2-Dn) for other plenoptic micro-images.

At 608, the method 600 includes accessing a plurality of subspaces (S1-Sn) associated with a set of pre-determined disparities (PD1-PDn). In an example embodiment, a subspace of the plurality of subspaces is associated with a corresponding pre-determined disparity of the set of pre-determined disparities.

At 610, the method 600 includes projecting the plenoptic vector (V1) for the plenoptic micro-image (MI1) in the plurality of subspaces associated with the set of pre-determined disparities.

At 612, the method 600 includes calculating a plurality of residual errors (RE1-REn) based on projections of the plenoptic vector (V1) in the plurality of subspaces (S1-Sn).

In an example embodiment, the plurality of residual errors (RE1-REn) are calculated by determining a plurality of reconstructed vectors for the plenoptic vector (V1) by reconstructing the individual patch of pixels in the plurality of subspaces, where a reconstructed vector of the plurality of reconstructed vectors is associated with a corresponding subspace of the plurality of subspaces; and determining the plurality of residual errors as corresponding differences between the plurality of reconstructed vectors and the plenoptic vector.

At 614, the method 600 includes determining the disparity (D1) for the plenoptic micro-image (MI1) based on a comparison of the plurality of residual errors (RE1-REn).

In an example embodiment, the disparity (D1) is determined by performing the comparison of the plurality of residual errors (RE1-REn); and selecting the disparity for which a residual error is minimum amongst the plurality of residual errors (RE1-REn). Similarly, the operations of the blocks 608-614 may be executed for assigning disparities (D2-Dn) to other plenoptic micro-images.

Figure 7:
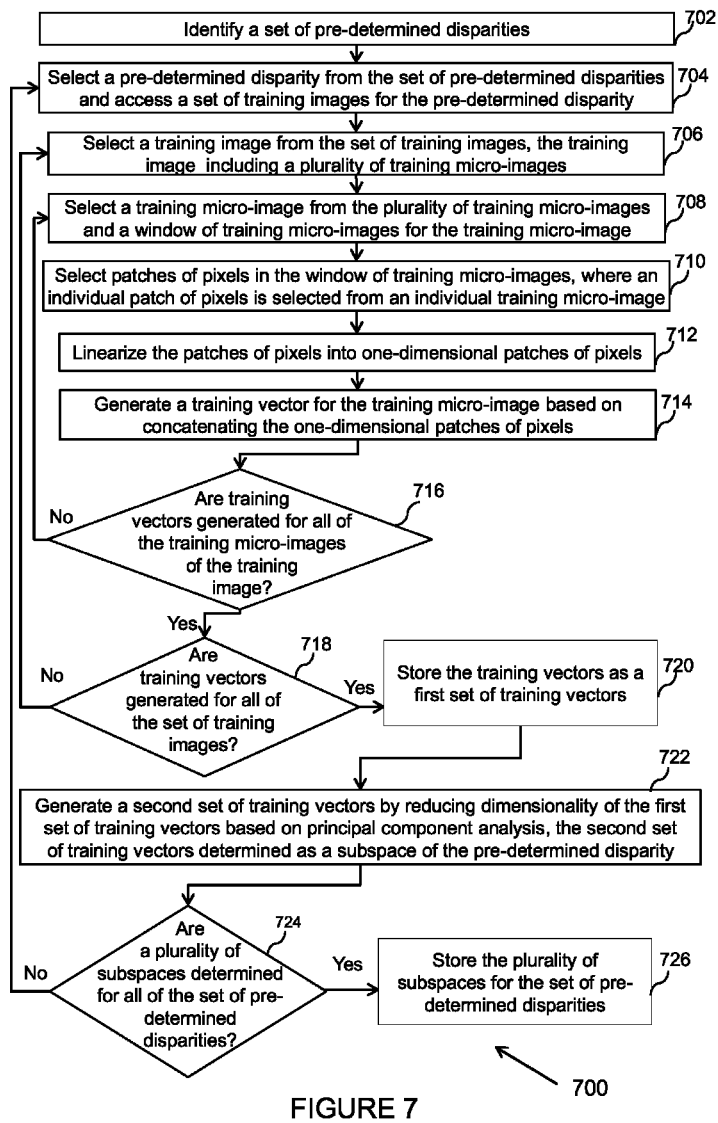
FIG. 7 is a flowchart depicting an example method for generation of a plurality of subspaces, in accordance with an example embodiment.

FIG. 7 is a flowchart depicting an example method for generation of a plurality of subspaces (S1-Sn), in accordance with an example embodiment. Example references of FIGS. 2 to 6 may be made for the description of the method 700. The method 700 depicted in the flowchart may be executed by, for example, the apparatus 200 of FIG. 2. The method 700 may also be termed as a training phase, as the subspaces are generated for various disparity values based on training images of the various disparity values.

At 702, the method 700 includes identifying a set of pre-determined disparities (PD1-PDn). The set of pre-determined disparities (PD1-PDn) may include various disparity values which may be of interest, or may depend upon usage of the apparatus 200, user preferences or as per the factory settings, and the like.

At 704, the method 700 includes selecting a pre-determined disparity (for example, a disparity PD1) from the set of pre-determined disparities (PD1-PDn) and accessing a set of training images (T1-Tn) for the pre-determined disparity (PD1). In an example embodiment, the set of training images (T1-Tn) may be captured by the focused plenoptic camera, whether the focused plenoptic camera is present in or otherwise accessible to the apparatus 200. In an example embodiment, each training image can be associated with different scenes. It should be noted that the set of training images (T1-Tn) are captured or accessed corresponding to each pre-determined disparity of the set of pre-determined disparities (PD1-PDn).

In an example embodiment, the focused plenoptic camera includes a micro-lens array (either a single-focus micro-lens array or a multi-focus micro-lens array) positioned between a main lens and a sensor of the focused plenoptic camera as shown in FIG. 3 to increase resolution of the set of training images (T1-Tn).

At 706, the method 700 includes selecting a training image (T1) from the set of training images (T1-Tn). Since, the training images (T1-Tn) are plenoptic images, each of the training images (T1-Tn) includes a plurality of training micro-images (TMI1-TMIm) depending upon the micro-lens array.

At 708, the method 700 includes selecting a training micro-image (TMI1) from the plurality of training micro-images (TMI1-TMIm). At 708, the method 700 also includes selecting a window of training micro-images for the training micro-image (TMI1) in the training image (T1). In an example embodiment, the window of training micro-images includes the training micro-image (TMI1) and a set of neighboring training micro-images of the training micro-image (TMI1). At 710, the method 700 includes selecting patches of pixels in the window of training micro-images, where an individual patch of pixels is selected from an individual training micro-image. Each patch of pixels includes a length parameter (for example, number of pixels in the height or the width of the single patch of pixels) greater than a maximum pre-determined disparity (PDn) in the set of pre-determined disparities (PD1-PDn). At 712, the method 700 includes linearizing the patches of pixels into one-dimensional patches of pixels, as the patches of pixels initially are two-dimensional patches of pixels before linearization. At 714, the method 700 includes generating a training vector (TV1) for the training micro-image (TMI1) based on concatenating the one-dimensional patches of pixels.

At 716, the method 700 includes determining if training vectors are generated for all of the training micro-images (TMI1-TMIm) of the training image (T1). If it is determined that the training vectors are not generated for all of the training micro-images (TMI1-TMIm) of the training image (T1), blocks 708-714 are repeated. For example, in a first pass of the blocks 708-714, the training vector TV1 is generated for the training micro-image TMI1, in a second pass of the blocks 708-714, a training vector TV2 is generated for the training micro-image TMI2, in a third pass of the blocks 708-714, a training vector TV3 is generated for the training micro-image TMI3, and so on. Accordingly, by repeatedly performing the blocks 708-714 in $m^{th}$ passes, the training vectors for all of the training micro-images (TMI1-TMIm) of the selected training image T1 are generated. At 716, if it is determined that the training vectors are generated for all of the training micro-images (TMI1-TMIm) in the training image (T1), the method 700 proceeds to block 718.

At 718, the method 700 includes determining if training vectors (for example, (TV1-TVmn)) are generated for all of the set of training images (T1-Tn). If it is determined that the training vectors (TV1-TVmn) are not generated for all of the set of training images (T1-Tn), operations of the blocks 706-716 are repeated. For example, in a first pass of the operation of the blocks 706-716, training vectors TV1-TVm are generated for the training image T1, in a second pass of operation of the blocks 706-716, training vectors TV1-TVm are generated for the training image T2, in a third pass of operation of the blocks 706-716, training vectors TV1-TVm are generated for the training image T3, and so on. Accordingly, by repeatedly performing the operation of the blocks 706-716 in $n^{th}$ passes, the training vectors (TV1-TVmn) for all of the set of training images (T1-Tn) are generated. At 718, if it is determined that the training vectors (TV1-TVmn) are generated for the set of training images (T1-Tn), the method 700 proceeds to block 720. At block 720 the training vectors (TV1-TVmn) are stored as a first set of training vectors (TV1-TVmn).

At 722, the method 700 includes generating a second set of training vectors (TV1-TVd) by reducing dimensionality of the first set of training vectors based on principal component analysis (PCA) (an example of a classification method). The second set of training vectors (TV1-TVd) is determined as a subspace (S1) of the pre-determined disparity (PD1). In an example embodiment, the second set of training vectors (TV1-TVd) are eigenvectors chosen based on associated eigenvalues. At 724, the method 700 includes determining if the plurality of subspaces (for example, S1-Sn) is determined for all of the set of pre-determined disparities (PD1-PDn). If it is determined that the plurality of subspaces (S1-Sn) for all of the set of pre-determined disparities (PD1-PDn) are not determined, operations of the blocks 704-722 are repeated. For example, in a first pass of operations of the blocks 704-722, the subspace S1 is determined for the pre-determined disparity PD1, in a second pass of operations of the blocks 704-722, a subspace S2 is determined for the pre-determined disparity PD2, in a third pass of operations of the blocks 704-722, a subspace S3 is determined for the pre-determined disparity PD3, and so on. Accordingly, by repeatedly performing the operations of the blocks 704-722 till $n^{th}$ pass, the plurality of subspaces (S1-Sn) for all of the set of pre-determined disparities (PD1-PDn) are determined. At 724, if it is determined that the plurality of subspaces (S1-Sn) are determined, the method 700 proceeds to block 726. At 726 the plurality of subspaces (S1-Sn) for the set of pre-determined disparities (PD1-PDn) are stored, for example in the memory 204 or any other storage location accessible to the apparatus 200.

In an example embodiment, for a focused plenoptic camera including a single-focus micro-lens array of micro-lenses of a single lens type, the plurality of subspaces (S1-Sn) associated with the set of pre-determined disparities (PD1-PDn) is determined. Herein, the "single-focus micro-lens array" refers to a micro-lens array of single lens type. Herein, the "single lens type" refers that each of the micro-lens of the micro-lens array has same focal length. In this example embodiment, the subspace (S1) of the plurality of subspaces for the pre-determined disparity (PD1) of the set of pre-determined disparities is determined by performing blocks 702-722. In another example embodiment, for a focused plenoptic camera including a multi-focus micro-lens array of micro-lenses of one or more lens types with corresponding focal lengths, the plurality of subspaces (S1-Sn) is determined by determining one or more subspaces (for example, subspaces $S^1$-$S^L$) for the one or more lens types (for example, L lens types $L_1$-$L_L$) for each pre-determined disparity (PD1) of the set of pre-determined disparities. Herein, the "one or more lens types" refers to micro-lenses of one or more focal lengths. For example, if there are three lens types, a subspace $S^1$, a subspace $S^2$, and a subspace $S^3$ of the plurality of subspaces (S1-Sn) correspond to a lens type $L_1$, a lens type $L_2$ and a lens type $L_3$ for the pre-determined disparity PD1 of the set of pre-determined disparities (PD1-PDn). In this example embodiment, the subspace is determined by performing 702-722. Some example embodiments of generation of the plurality of subspaces in a multi-focus micro-lens array are further explained with reference to FIG. 9.

Figure 8:
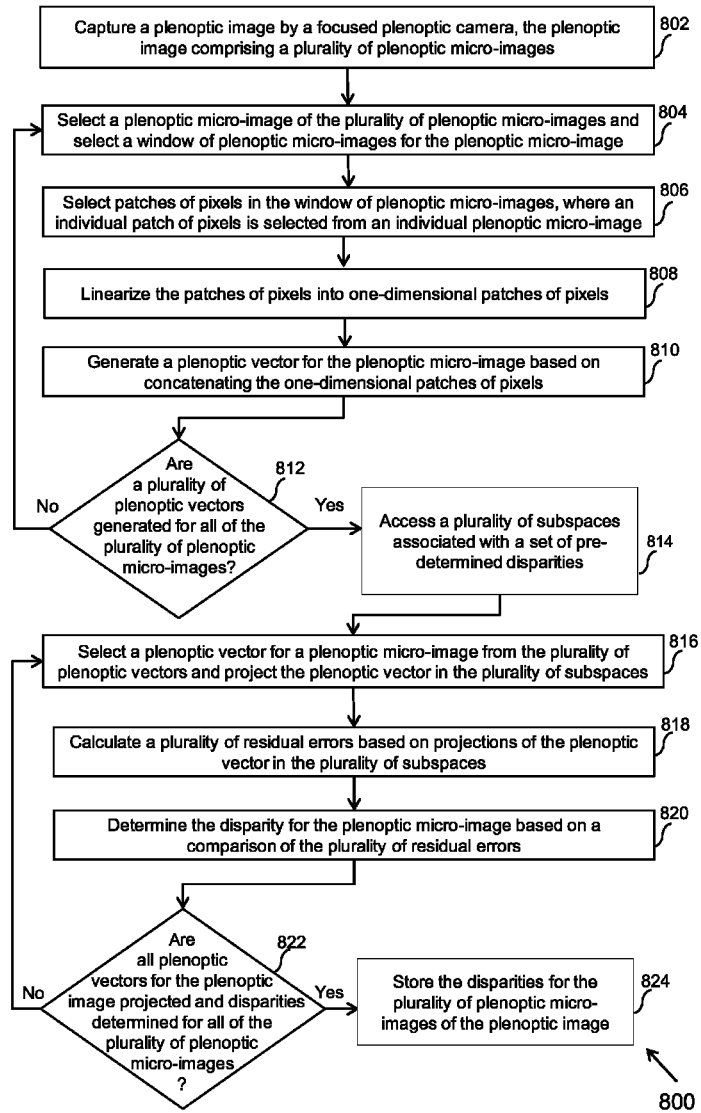
FIG. 8 is a flowchart depicting an example method for disparity estimation of plenoptic images captured from a focused plenoptic camera including a single-focus micro-lens array, in accordance with an example embodiment.

FIG. 8 is a flowchart depicting an example method 800 for disparity estimation of plenoptic images captured from a focused plenoptic camera including a single-focus microlens array, in accordance with an example embodiment. The focused plenoptic camera includes the single-focus micro-lens array of micro-lenses of a single lens type. Example references are made to FIGS. 2 to 7 for the description of the method 800. The method 800 depicted in the flowchart may be executed by, for example, the apparatus 200 of FIG. 2.

At 802, the method 800 includes capturing a plenoptic image (I) by the focused plenoptic camera. The plenoptic image (I) includes a plurality of plenoptic micro-images (MI1-MIn). At 804, the method 800 includes selecting a plenoptic micro-image (for example, MI1) of the plurality of plenoptic micro-images (MI1-MIn) and a window of plenoptic micro-images for the plenoptic micro-image (MI1). At 806, the method 800 includes selecting patches of pixels in the window of plenoptic micro-images, where an individual patch of pixels is selected from an individual plenoptic micro-image (MI1). At 808, the method 800 includes linearizing the patches of pixels into one-dimensional patches of pixels. At 810, the method 800 includes generating a plenoptic vector (V1) for the plenoptic micro-image (MI1) based on concatenating the one-dimensional patches of pixels.

At 812, the method 800 includes determining if a plurality of plenoptic vectors is generated for all of the plurality of plenoptic micro-images (MI1-MIn) in the plenoptic image (I). If it is determined that the plenoptic vectors are not generated for all of the plurality of plenoptic micro-images (MI1-MIn) in the plenoptic image (I), blocks 804-810 are repeated. For example, in a first pass of the blocks 804-810, the plenoptic vector V1 is generated for the plenoptic micro-image MI1, in a second pass of the blocks 804-810, a plenoptic vector V2 is generated for the plenoptic micro-image MI2, in a third pass of the blocks 804-810, a plenoptic vector V3 is generated for the plenoptic micro-image MI3, and so on. Accordingly, by repeatedly performing the blocks 804-810 in $n^{th}$ passes, the plurality of plenoptic vectors (V1-Vn) for all of the plenoptic micro-images (MI1 -MIn) of the plenoptic image I are generated. At 812, if it is determined that the plurality of plenoptic vectors (V1-Vn) is generated for all of the plurality of plenoptic micro-images (MI1-MIn) in the plenoptic image (I), the method 800 proceeds to block 814. At 814, a plurality of subspaces (S1-Sn) stored (for example at block 726) are accessed. The plurality of subspaces is associated with pre-determined disparities (PD1-PDn). Some example embodiments of generation of the subspaces (S1-Sn) are described with reference to FIG. 7.

At 816, the method 800 includes selecting a plenoptic vector for example, the plenoptic vector (V1) for the plenoptic micro-image (MI1), and projecting the plenoptic vector (V1) in the plurality of subspaces (S1-Sn). At 818, the method 800 includes calculating a plurality of residual errors (RE1-REn) based on projections of the plenoptic vector (V1) in the plurality of subspaces (S1-Sn). At 820, the method 800 includes determining the disparity (D1) for the plenoptic micro-image (V1) based on a comparison of the plurality of residual errors. A minimum of the residual errors (RE1-REn) is determined and the pre-determined disparity for which the residual error is the least among the residual errors (RE1-REn) is determined as the disparity (D1) of the plenoptic micro-image (MI1).

At 822, the method 800 includes determining if all of the plenoptic vectors (V1-Vn) for the plenoptic image (I) are projected in the plurality of subspaces (S1-Sn) and if all the disparities (D1-Dn) are determined for the plurality of plenoptic micro-images (MI1-MIn). If it is determined that all the plenoptic vectors are not projected and disparities are not determined for the plurality of plenoptic micro-images (MI1-MIn), blocks 816-820 are repeated. For example, in a first pass of the blocks 816-820, the plenoptic vector V1 is selected and projected in the subspaces S1-Sn and the disparity D1 is determined/assigned for the plenoptic micro-image MI1, in a second pass of the blocks 816-820, the plenoptic vectors V2 is selected and projected in the subspaces S1-Sn and the disparity D2 is determined/assigned for the plenoptic micro-image MI2, in a third pass of the blocks 816-820, the plenoptic vectors V3 is selected and projected in the subspaces S1-Sn and the disparity D3 is determined/assigned for the plenoptic micro-image MI3, and so on. Accordingly, by repeatedly performing the blocks 816-820 in $n^{th}$ passes, the plenoptic vectors (V1-Vn) for the plenoptic image (I) are projected in the plurality of subspaces (S1-Sn) and all the disparities (D1-Dn) are assigned to the plenoptic micro-images (MI1-MIn). At 822, if it is determined that all the plenoptic vectors are projected and all the disparities are assigned, the method 800 proceeds to block 824. At 824, the method 800 includes storing the disparities for the plurality of plenoptic micro-images (MI1-MIn) of the plenoptic image. In an example embodiment, a depth map of the plenoptic image (I) is estimated based on the disparities (D1-Dn).

In various embodiments, the focused plenoptic camera may include a multi-focus micro-lens array of micro-lenses of the one or more lens types (for example, 3 lens types $L_1$-$L_3$) with corresponding focal lengths. As described in reference to FIG. 7, the generation of the plurality of subspaces is described in case of a single lens type used in the focused plenoptic camera including a single-focus micro-lens array of micro-lenses. However, various example embodiments provision the generation of a plurality of subspaces in case of one or more lens types used in the focused plenoptic camera, and are described with reference to FIG. 9.

Figure 9:
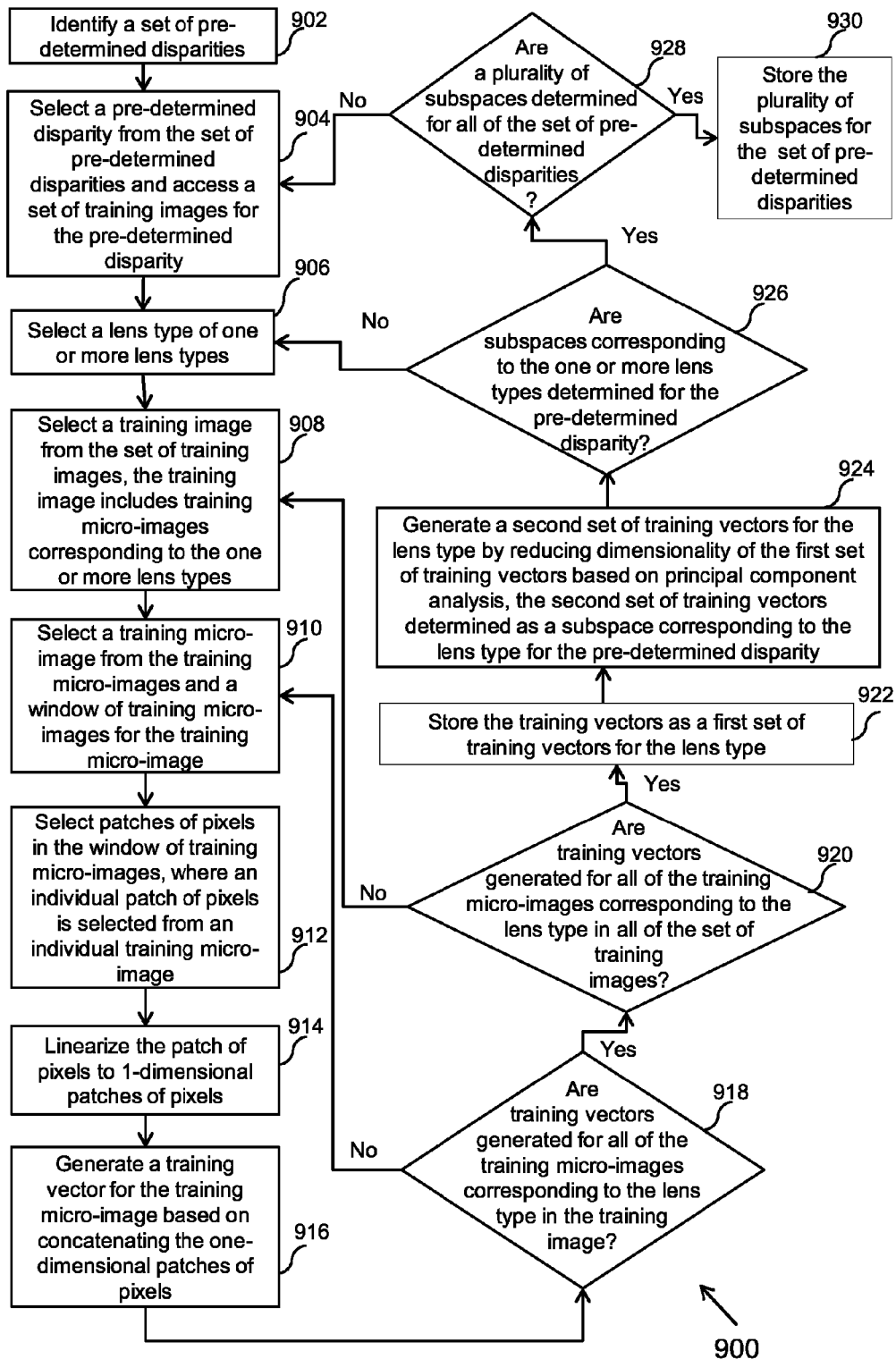
FIG. 9 is a flowchart depicting an example method for determining subspaces for one or more lens types associated with a focused plenoptic camera including a multi-focus micro-lens array, in accordance with an example embodiment.

FIG. 9 is a flowchart depicting an example method 900 for determining subspaces for one or more lens types associated with a focused plenoptic camera including a multi-focus micro-lens array, in accordance with an example embodiment. The focused plenoptic camera includes the multi-focus micro-lens array of micro-lenses of the one or more lens types (for example, 3 lens types $L_1$-$L_3$) with corresponding focal lengths. Example references are made to FIGS. 2 to 8 for the description of the method 900. The method 900 depicted in the flowcharts may be executed by, for example, the apparatus 200 of FIG. 2.

At 902, the method 900 includes identifying a set of pre-determined disparities (PD1-PDn). At 904, the method 900 includes selecting a pre-determined disparity (PD1) from the set of pre-determined disparities (PD1-PDn) and accessing a set of training images (T1-Tn) for the pre-determined disparity (PD1). In an example embodiment, the training images (T1-Tn) may be captured by the focused plenoptic camera, where the focused plenoptic camera is present in or otherwise accessible to the apparatus 200. In an example embodiment, each training image can be associated with different scenes.

At 906, the method 900 includes selecting a lens type (for example $L_1$) of one or more lens types for example, of lens types $L_1$-$L_3$. At 908, the method 900 includes selecting a training image (T1) from the set of training images (T1-Tn). The training image (T1) includes training micro-images corresponding to the one or more lens types ($L_1$-$L_3$). At 910, the method 900 includes selecting a training micro-image, for example, a training micro-image (TMI1) from the training micro-images of the selected training image (T1). At

910, the method 900 also includes selecting a window of training micro-images around the training micro-image (TMI1). At 912, the method 900 includes selecting patches of pixels in the window of training micro-images, where an individual patch of pixels is selected from an individual training micro-image of the window of training micro-images. At 914, the method 900 includes linearizing the patch of pixels into one-dimensional patches of pixels. At 916, the method 900 includes generating a training vector (TV1) for the training micro-image (TMI1) based on concatenating the one-dimensional patches of pixels.

At 918, the method 900 includes determining if training vectors are generated for all of the training micro-images corresponding to the lens type ($L_1$) in the training image (T1). If it is determined that all the training vectors are not generated for all of the training micro-images corresponding to the lens type ($L_1$) in the training image (T1), blocks 910-916 are repeated. For example, in a first pass of the blocks 910-916, a first training vector (TV1) is generated for a first training micro-image (TMI1) corresponding to the lens type $L_1$ in the training image T1; in a second pass of the blocks 910-916, a second training vector (TV5) is generated for the second training micro-image (TMI5) corresponding to the lens type $L_1$ in the training image T1; in a third pass of the blocks 910-916, a third training vector (TV9) is generated for the third training micro-image (TMI9) corresponding to the lens type $L_1$ in the training image T1, and so on. Accordingly, by repeatedly performing the blocks 910-916 in multiple passes, the training vectors for all of the training micro-images corresponding to the lens type ($L_1$) in the training image (T1) are generated. At 918, if it is determined that the training vectors are generated for all of the training micro-images corresponding to the lens type ($L_1$) in the training image (T1), the method 900 proceeds to block 920.

At 920, the method 900 includes determining if training vectors are generated for all of the training micro-images corresponding to the lens type ($L_1$) in all of the set of training images (T1-Tn). If it is determined that the training vectors are not generated for all of the training micro-images corresponding to the lens type ($L_1$) in all of the set of training images (T1-Tn), blocks 908-918 are repeated. For example, in a first pass of the blocks 908-918, training vectors are generated for training micro-images corresponding to the lens type $L_1$ in a training image T1, in a second pass of the blocks 908-918, training vectors are generated for training micro-images corresponding to the lens type $L_1$ in a training image T2, in a third pass of the blocks 908-918, training vectors are generated for training micro-images corresponding to the lens type $L_1$ in a training image T3, and so on. Accordingly, by repeatedly performing the blocks 908-918 in multiple passes, the training vectors for all of the training micro-images corresponding to the lens type ($L_1$) in the set of training images (T1-Tn) are generated. At 920, if it is determined that training vectors are generated for all of the training micro-images corresponding to the lens type ($L_1$) in all of the set of training images (T1-Tn), the method 900 proceeds to block 922. At block 922 the training vectors for the lens type ($L_1$) are stored as a first set of training vectors.

At 924, the method 900 includes generating a second set of training vectors for the lens type ($L_1$) by reducing dimensionality of the first set of training vectors based on principal component analysis (PCA) (an example of a classification method). The second set of training vectors is determined as a subspace ($S1^1$) corresponding to the lens type ($L_1$) for the pre-determined disparity (PD1). In an example embodiment, the second set of training vectors are eigenvectors chosen based on associated eigenvalues. At 926, the method 900 includes determining if subspaces (for example, 3 subspaces $S1^1$-$S1^3$) corresponding to the one or more lens types ($L_1$-$L_3$) are determined for the pre-determined disparity (PD1). If it is determined that all subspaces (for example, 3 subspaces $S1^1$-$S1^3$) corresponding to the one or more lens types ($L_1$-$L_3$) are not determined for the pre-determined disparity (PD1), blocks 906-924 are repeated (for remaining lens types, for example lens types $L_2$ and $L_3$). For example, for 3 lens types $L_1$-$L_3$, in a first pass of the blocks 906-924, the subspace $S1^1$ corresponding to lens type $L_1$ is determined for the pre-determined disparity PD1, in a second pass of the blocks 906-924, a subspace $S1^2$ corresponding to lens type $L_2$ is determined for the pre-determined disparity PD1, in a third pass of the blocks 906-924, a subspace $S1^3$ corresponding to lens type $L_3$ is determined for the pre-determined disparity PD1. Accordingly, by repeatedly performing the blocks 906-924 in multiple passes, the subspaces ($S1^1$-$S1^3$) for the pre-determined disparity (PD1) are determined. At 926, if it is determined that all subspaces (for example, 3 subspaces $S1^1$, $S1^2$, $S1^3$) corresponding to the one or more lens types ($L_1$-$L_3$) are determined for the pre-determined disparity (PD1), the method 900 proceeds to block 928.

At 928, the method 900 includes determining if a plurality of subspaces ($S1^1$, $S1^2$, $S1^3$, $S2^1$ . . . and $Sn^3$) is determined for all of the set of pre-determined disparities (PD1-PDn). If it is determined that the plurality of subspaces ($S1^1$, $S1^2$, $S1^3$, $S2^1$ . . . and $Sn^3$) are not determined for all of the set of pre-determined disparities (PD1-PDn), blocks 904-926 are repeated. For example, for 3 lens types $L_1$-$L_3$, in a first pass of the blocks 904-926, subspaces $S1^1$, $S1^2$ and $S1^3$ corresponding to lens types $L_1$, $L_2$ and $L_3$ are determined for the pre-determined disparity PD1, in a second pass of the blocks 904-926, subspaces $S2^1$, $S2^2$ and $S2^3$ corresponding to lens types $L_1$, $L_2$, and $L_3$ are determined for the pre-determined disparity PD2, in a third pass of the blocks 904-926, subspaces $S3^1$, $S3^2$ and $S3^3$ corresponding to lens types $L_1$, $L_2$, and $L_3$ are determined for the pre-determined disparity PD3, and so on. Accordingly, by repeatedly performing the blocks 904-926 in multiple passes, the plurality of subspaces ($S1^1$, $S1^2$, $S1^3$; $S2^1$, $S2^2$, $S2^3$; . . . $Sn^1$, $Sn^2$, $Sn^3$) for the set of pre-determined disparities (PD1-PDn) are determined. At 928, if it is determined that the plurality of subspaces ($Si^1$, $S1^2$, $S1^3$; $S2^1$, $S2^2$, $S2^3$; . . . $Sn^1$, $Sn^2$, $Sn^3$) are determined for all of the set of pre-determined disparities (PD1-PDn), the method 900 proceeds to block 930. At 930 the plurality of subspaces ($Si^1$, $S1^2$, $S1^3$; $S2^1$, $S2^2$, $S2^3$; . . . $Sn^1$, $Sn^2$, $Sn^3$) for the set of pre-determined disparities (PD1-PDn) is stored, for example in a memory of the focused plenoptic camera.

The subspaces ($S1^1$, $S1^2$, $S1^3$; $S2^1$, $S2^2$, $S2^3$; . . . $Sn^1$, $Sn^2$, $Sn^3$) determined above can be further used in the disparity estimation of plenoptic images captured by the focused plenoptic camera as described further with respect to FIG. 10 (blocks 1002-1024).

Figure 10:
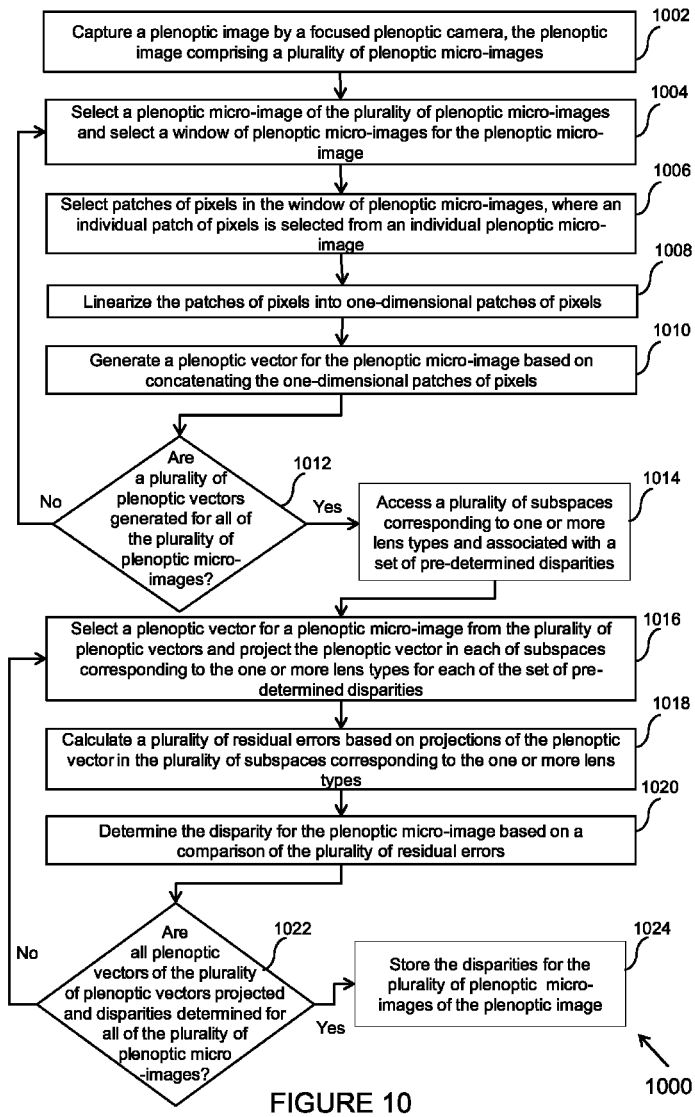
FIG. 10 is a flowchart depicting an example method for disparity estimation of plenoptic images captured from a focused plenoptic camera including a multi-focus micro-lens array, in accordance with an example embodiment.

FIG. 10 is a flowchart depicting example method 1000 for disparity estimation of plenoptic images captured from a focused plenoptic camera including a multi-focus micro-lens array, in accordance with an example embodiment. The focused plenoptic camera includes the multi-focus micro-lens array of micro-lenses of one or more lens types. Example references are made to FIGS. 2 to 9 for the description of the method 1000. The method 1000 depicted in the flowchart may be executed by, for example, the apparatus 200 of FIG. 2.

At 1002, the method 1000 includes capturing a plenoptic image (I) by the focused plenoptic camera. The plenoptic image (I) includes a plurality of plenoptic micro-images (MI1-MIn). At 1004, the method 1000 includes selecting a plenoptic micro-image (for example, MI1) of the plurality of plenoptic micro-images (MI1-MIn) and selecting a window of plenoptic micro-images for the plenoptic micro-image (MI1). At 1006, the method 1000 includes selecting patches of pixels in the window of plenoptic micro-images, where an individual patch of pixels is selected from an individual plenoptic micro-image (MI1). At 1008, the method 1000 includes linearizing the patches of pixels into one-dimensional patches of pixels. At 1010, the method 1000 includes generating a plenoptic vector (V1) for the plenoptic micro-image (MI1) based on concatenating the one-dimensional patches of pixels.

At 1012, the method 1000 includes determining if a plurality of plenoptic vectors is generated for all of the plurality of plenoptic micro-images (MI1-MIn) in the plenoptic image (I). If it is determined that the plenoptic vectors are not generated for all of the plurality of plenoptic micro-images (MI1-MIn) in the plenoptic image (I), blocks 1004-1010 are repeated. For example, in a first pass of the blocks 1004-1010, the plenoptic vector V1 is generated for the plenoptic micro-image MI1, in a second pass of the blocks 1004-1010, a plenoptic vector V2 is generated for the plenoptic micro-image MI2, in a third pass of the blocks 1004-1010, a plenoptic vector V3 is generated for the plenoptic micro-image MI3, and so on. Accordingly, by repeatedly performing the blocks 1004-1010 in $n^{th}$ passes, the plurality of plenoptic vectors (V1-Vn) for all of the plenoptic micro-images (MI1-MIn) of the plenoptic image I are generated. At 1012, if it is determined that the plurality of plenoptic vectors (V1-Vn) is generated for all of the plurality of plenoptic micro-images (MI1-MIn) in the plenoptic image (I), the method 1000 proceeds to block 1014. At 1014, a plurality of subspaces ($S1^1$, $S1^2$, $S1^3$; $S2^1$, $S2^2$, $S2^3$; ... $Sn^1$, $Sn^2$, $Sn^3$) corresponding to the one or more lens types ($L_1$, $L_2$ and $L_3$) which are stored (for example at block 930) are accessed. The plurality of subspaces is associated with pre-determined disparities (PD1-PDn). Some example embodiments of generation of the subspaces ($S1^1$, $S1^2$, $S1^3$; $S2^1$, $S2^2$, $S2^3$; ... $Sn^1$, $Sn^2$, $Sn^3$) are described with reference to FIG. 9.

At 1016, the method 1000 includes selecting a plenoptic vector, for example the plenoptic vector (V1), for the plenoptic micro-image (MI1) and projecting the plenoptic vector (V1) in each of subspaces (for example, $S1^1$, $S1^2$, $S1^3$; $S2^1$, $S2^2$, $S2^3$; ... $Sn^1$, $Sn^2$, $Sn^3$) corresponding to the one or more lens types ($L_1$, $L_2$ and $L_3$) for each of the set of pre-determined disparities (PD1-PDn). For example, if 3 subspaces $S1^1$, $S1^2$ and $S1^3$ corresponding to lens types $L_1$, $L_2$ and $L_3$, respectively, are determined for the pre-determined disparity PD1, and 3 subspaces $S2^1$, $S2^2$, and $S2^3$ corresponding to lens types $L_1$, $L_2$ and $L_3$ are determined for the pre-determined disparity PD2, the plenoptic vector V1 is projected into $S^1$, $S1^2$ and $S1^3$; $S2^1$, $S2^2$, and $S2^3$; and so on.

At 1018, the method 1000 includes calculating a plurality of residual errors (REV, $RE1^2$, $RE1^3$; $RE2^1$, $RE2^2$, $RE2^3$; ... $REn^1$, $REn^2$, $REn^3$) based on projections of the plenoptic vector (V1) in the plurality of subspaces ($S1^1$, $S1^2$, $S1^3$; $S2^1$, $S2^2$, $S2^3$; ... $Sn^1$, $Sn^2$, $Sn^3$) corresponding to the one or more lens types. The residual errors ($RE1^1$, $RE1^2$, $RE1^3$; $RE2^1$, $RE2^2$, $RE2^3$; ... $REn^1$, $REn^2$, $REn^3$) are calculated based on differences between the plenoptic vector V1 and reconstructed vectors ($RV1^1$ for subspace $S1^1$, $RV1^2$ for subspace $S1^2$, $RV1^3$ for subspace $S1^3$ ... and $RVn^3$ for subspace $Sn^3$), respectively. At 1020, the method 1000 includes determining the disparity (D1) for the plenoptic micro-image (MI1) based on a comparison of the plurality of residual errors ($RE1^1$, $RE1^2$, ... $REn^3$). A minimum of the residual errors ($REV-REn^3$) is determined and the pre-determined disparity for which the residual error is the least among the residual errors ($REV-REn^3$) is determined as the disparity (D1) of the plenoptic micro-image (MI1). For example, if residual error $RE2^1$ is minimum amongst the residual errors $RE1^1$-$REn^3$, then the pre-determined disparity PD2 is assigned as the disparity D1 for the plenoptic micro-image MI1.

At 1022, the method 1000 includes determining if all of the plenoptic vectors (V1-Vn) for the plenoptic image (I) are projected in the plurality of subspaces ($S1^1$, $S1^2$, $S1^3$; $S2^1$, $S2^2$, $S2^3$; ... $Sn^1$, $Sn^2$, $Sn^3$) and if all the disparities (D1-Dn) are determined for the plurality of plenoptic micro-images (MI1-MIn). If it is determined that all the plenoptic vectors are not projected and disparities are not determined for the plurality of plenoptic micro-images (MI1-MIn), blocks 1016-1020 are repeated. For example, in a first pass of the blocks 1016-1020, the plenoptic vector V1 is selected and projected in the subspaces ($S1^1$, $S1^2$, $S1^3$; $S2^1$, $S2^2$, $S2^3$; ... $Sn^1$, $Sn^2$, $Sn^3$) and the disparity D1 is determined/assigned for the plenoptic micro-image MI1, in a second pass of the blocks 1016-1020, the plenoptic vector V2 is selected and projected in the subspaces ($S1^1$, $S1^2$, $S1^3$; $S2^1$, $S2^2$, $S2^3$; ... $Sn^1$, $Sn^2$, $Sn^3$) and the disparity D2 is determined/assigned for the plenoptic micro-image MI2, in a third pass of the blocks 1016-1020, the plenoptic vector V3 is selected and projected in the subspaces ($S1^1$, $S1^2$, $S1^3$; $S2^1$, $S2^2$, $S2^3$; ... $Sn^1$, $Sn^2$, $Sn^3$) and the disparity D3 is determined/assigned for the plenoptic micro-image MI3, and so on. Accordingly, by repeatedly performing the blocks 1016-1020 in $n^{th}$ passes, the plenoptic vectors (V1-Vn) for the plenoptic image (I) are projected in the plurality of subspaces ($S1^1$, $S1^2$, $S1^3$; $S2^1$, $S2^2$, $S2^3$; ... $Sn^1$, $Sn^2$, $Sn^3$) and all the disparities (D1-Dn) are assigned to the plenoptic micro-images (MI1-MIn). At 1022, if it is determined that all the plenoptic vectors are projected and all the disparities are assigned, the method 1000 proceeds to block 1024. At 1024, the method 1000 includes storing the disparities for the plenoptic micro-images (MI1-MIn) of the plenoptic image. In an example embodiment, a depth map of the plenoptic image (I) is estimated based on the disparities (D1-Dn).

In another example embodiment, in order to reduce computational complexity, if it is already known that a plenoptic micro-image (MI1) corresponds to the lens type $L_1$, then the plenoptic vector V1 of the plenoptic micro-image MI1 is projected only on the subspaces $S1^1$, $S2^1$, $S3^1$, ... and $Sn^1$. The corresponding residual errors $RE1^1$, $RE2^1$, ... $REn^1$ are further calculated to determine a minimum residual error. The pre-determined disparity corresponding to the minimum residual error is in turn assigned as the disparity Dl for the plenoptic micro-image MI1.

It should be noted that to facilitate discussions of the flowcharts of FIGS. 6, 7, 8, 9 and 10 certain operations are described herein as constituting distinct steps performed in a certain order. Such implementations are examples only and non-limiting in scope. Certain operation may be grouped together and performed in a single operation, and certain operations can be performed in an order that differs from the order employed in the examples set forth herein. Moreover, certain operations of the methods 600, 700, 800, 900 and 1000 are performed in an automated fashion. These operations involve substantially no interaction with the user.

Other operations of the methods 600, 700, 800, 900 and 1000 may be performed by in a manual fashion or semi-automatic fashion. These operations involve interaction with the user via one or more user interface presentations.

The methods depicted in these flow charts may be executed by, for example, the apparatus 200 of FIG. 2. Operations of the flowchart, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus, provide operations for implementing the operations in the flowchart. The operations of the methods are described with help of apparatus 200. However, the operations of the methods can be described and/or practiced by using any other apparatus.

Without in any way limiting the scope, interpretation, or application of the claims appearing below, a technical effect of one or more of the example embodiments disclosed herein is to determine disparities of plenoptic micro-images in a plenoptic image (a plenoptic image), captured by a focused plenoptic camera (having a single-focus micro-lens array or a multi-focus micro-lens array), for efficient and robust disparity estimation of the plenoptic image. The present disclosure enables the disparity estimation in image regions beyond existing depth regions that may be blurred, and identification of the image regions beyond a depth of interest such that the image regions can be blurred out for a desired image region to be of improved depth resolution. The present disclosure further enables identification of plane regions and a robust method for disparity estimation of noisy images. Various embodiments are capable of estimating depth of the plenoptic image by employing the focused plenoptic camera having a micro-lens array positioned closer to the sensor (in other words, having a larger distance between a main lens and the micro-lens array) and such setup of the focused plenoptic camera can be integrated in small hand-held devices, for example mobile phones.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

We claim:

1. A method comprising:
   facilitating receipt of a plenoptic image associated with a scene, the plenoptic image comprising a plurality of plenoptic micro-images and being captured by a focused plenoptic camera;
   generating a plurality of plenoptic vectors for the plurality of plenoptic micro-images of the plenoptic image, wherein an individual plenoptic vector of the plurality of plenoptic vectors is generated for an individual plenoptic micro-image of the plurality of plenoptic micro-images; and
   assigning disparities for the plurality of plenoptic micro-images of the plenoptic image, wherein a disparity of the disparities for a plenoptic micro-image of the plurality of plenoptic micro-images is assigned at least by:
   accessing a plurality of subspaces associated with a set of pre-determined disparities, wherein a subspace of the plurality of subspaces is associated with a corresponding pre-determined disparity of the set of pre-determined disparities,
   projecting a plenoptic vector for the plenoptic micro-image in the plurality of subspaces associated with the set of pre-determined disparities,
   calculating a plurality of residual errors based on projections of the plenoptic vector in the plurality of subspaces, and
   determining the disparity for the plenoptic micro-image based on a comparison of the plurality of residual errors.

2. The method as claimed in claim 1, further comprising:
   selecting a window of plenoptic micro-images for the plenoptic micro-image, the window of plenoptic micro-images comprising the plenoptic micro-image and a set of neighboring plenoptic micro-images of the plenoptic micro-image;

selecting patches of pixels in the window of plenoptic micro-images, wherein an individual patch of pixels of the patches of pixels is selected from an individual plenoptic micro-image of the window of plenoptic micro-images;

linearizing the patches of pixels into one-dimensional patches of pixels; and generating the plenoptic vector for the plenoptic micro-image based on concatenating the one-dimensional patches of pixels.

3. The method as claimed in claim 2, wherein calculating the plurality of residual errors comprises:

determining a plurality of reconstructed vectors for the plenoptic vector by reconstructing patches of pixels for the plurality of subspaces, wherein a reconstructed vector of the plurality of reconstructed vectors is determined based on a reconstructed patch of pixels for a corresponding subspace of the plurality of subspaces; and determining the plurality of residual errors based on differences between the plurality of reconstructed vectors and the plenoptic vector.

4. The method as claimed in claim 3, wherein determining the disparity for the plenoptic micro-image based on the comparison of the plurality of residual errors comprises:

performing the comparison of the plurality of residual errors; and selecting the disparity for which a residual error is minimum among the plurality of residual errors.

5. The method as claimed in claim 1, wherein the method further comprises:

determining the plurality of subspaces associated with the set of pre-determined disparities, wherein a subspace of the plurality of subspaces for a pre-determined disparity of the set of pre-determined disparities is determined by:

facilitating receipt of a set of training images, the set of training images comprising a plurality of training micro-images;

generating a first set of training vectors for the plurality of training micro-images of the set of training images, wherein a training vector of the first set of training vectors associated with a training micro-image of the plurality of training micro-images is determined by:

selecting a window of training micro-images for the training micro-image, the window of training micro-images comprising the training micro-image and a set of neighboring training micro-images of the training micro-image, selecting patches of pixels in the window of training micro-images, wherein an individual patch of pixels of the patches of pixels in the window of training micro-images is selected from an individual training micro-image of the window of training micro-images, linearizing the patches of pixels into one-dimensional patches of pixels, and generating the training vector for the training micro-image based on concatenating the one-dimensional patches of pixels; and generating a second set of training vectors by reducing dimensionality of the first set of training vectors, wherein the second set of training vector corresponds to the pre-determined disparity of the subspace.

6. The method as claimed in claim 1, wherein the method further comprises:

determining the plurality of subspaces by determining one or more subspaces for the one or more lens types for each pre-determined disparity of the set of pre-determined disparities, wherein a subspace of the plurality of subspaces corresponds to a lens type of one or more lens types and corresponds to a pre-determined disparity of the set of pre-determined disparities, and wherein the subspace is determined by:

facilitating receipt of a set of training images, the set of training images comprising a plurality of training micro-images;

generating a first set of training vectors for the plurality of training micro-images of the set of training images, wherein a training vector of the first set of training vectors associated with a training micro-image of the plurality of training micro-images is determined by:

selecting a window of training micro-images for the training micro-image, the window of training micro-images comprising the training micro-image and a set of neighboring training micro-images of the training micro-image, selecting patches of pixels in the window of training micro-images, wherein an individual patch of pixels of the patches of pixels in the window of training micro-images is selected from an individual training micro-image of the window of training micro-images, linearizing the patches of pixels into one-dimensional patches of pixels, and generating the training vector for the training micro-image based on concatenating the one-dimensional patches of pixels; and generating a second set of training vectors by reducing dimensionality of the first set of training vectors, wherein the second set of training vector corresponds to the pre-determined disparity of the subspace.

7. The method as claimed in claim 2, wherein the individual patch of pixels comprises a length parameter greater than a maximum pre-determined disparity in the set of pre-determined disparities.

8. The method as claimed in claim 5, wherein the second set of training vectors are generated from the first set of training vectors based on applying a principal component analysis of the first set of training vectors.

9. The method as claimed in claim 5, wherein determining the plurality of subspaces further comprises storing the plurality of subspaces.

10. The method as claimed in claim 6, wherein accessing the plurality of subspaces comprises accessing the one or more subspaces for one or more lens types for each pre-determined disparity of the set of pre-determined disparities; and wherein projecting the plenoptic vector for the plenoptic micro-image comprises projecting the plenoptic vector in the one or more subspaces for the one or more lens types for each pre-determined disparity.

11. An apparatus comprising:

at least one processor; and at least one memory comprising computer program code, the at least one memory and the computer program code configured to, with the at least one processor, cause the apparatus to at least perform:

facilitate receipt of a plenoptic image associated with a scene, the plenoptic image comprising a plurality of plenoptic micro-images and being captured by a focused plenoptic camera;

generate a plurality of plenoptic vectors for the plurality of plenoptic micro-images of the plenoptic image, wherein an individual plenoptic vector of the plurality of plenoptic vectors is generated for an individual plenoptic micro-image of the plurality of plenoptic micro-images; and assign disparities for the plurality of plenoptic micro-images of the plenoptic image, wherein a disparity of the disparities for a plenoptic micro-image of the plurality of plenoptic micro-images is assigned at least by:

accessing a plurality of subspaces associated with a set of pre-determined disparities, wherein a subspace of the plurality of subspaces is associated with a corresponding pre-determined disparity of the set of pre-determined disparities, projecting a plenoptic vector for the plenoptic micro-image in the plurality of subspaces associated with the set of pre-determined disparities, calculating a plurality of residual errors based on projections of the plenoptic vector in the plurality of subspaces, and determining the disparity for the plenoptic micro-image based on a comparison of the plurality of residual errors.

12. The apparatus as claimed in claim 11, wherein the apparatus is further caused, at least in part to:

select a window of plenoptic micro-images for the plenoptic micro-image, the window of plenoptic micro-images comprising the plenoptic micro-image and a set of neighboring plenoptic micro-images of the plenoptic micro-image;

select patches of pixels in the window of plenoptic micro-images, wherein an individual patch of pixels of the patches of pixels is selected from an individual plenoptic micro-image of the window of plenoptic micro-images;

linearize the patches of pixels into one-dimensional patches of pixels; and generate the plenoptic vector for the plenoptic micro-image based on concatenating the one-dimensional patches of pixels.

13. The apparatus as claimed in claim 12, wherein for calculating the plurality of residual errors the apparatus is further caused, at least in part to:

determine a plurality of reconstructed vectors for the plenoptic vector by reconstructing patches of pixels for the plurality of subspaces, wherein a reconstructed vector of the plurality of reconstructed vectors is determined based on a reconstructed patch of pixels for a corresponding subspace of the plurality of subspaces; and determine the plurality of residual errors based on differences between the plurality of reconstructed vectors and the plenoptic vector.

14. The apparatus as claimed in claim 13, wherein for determining the disparity for the plenoptic micro-image based on the comparison of the plurality of residual errors the apparatus is further caused, at least in part to:

perform the comparison of the plurality of residual errors; and select the disparity for which a residual error is minimum among the plurality of residual errors.

15. The apparatus as claimed in claim 11, wherein the focused plenoptic camera comprises a single-focus micro-lens array comprising micro-lenses of a single lens type, and wherein the apparatus is further caused, at least in part to:

determine the plurality of subspaces associated with the set of pre-determined disparities, wherein a subspace of the plurality of subspaces for a pre-determined disparity of the set of pre-determined disparities is determined by:

facilitating receipt of a set of training images, the set of training images comprising a plurality of training micro-images;

generating a first set of training vectors for the plurality of training micro-images of the set of training images, wherein a training vector of the first set of training vectors associated with a training micro-image of the plurality of training micro-images is determined by:

selecting a window of training micro-images for the training micro-image, the window of training micro-images comprising the training micro-image and a set of neighboring training micro-images of the training micro-image, selecting patches of pixels in the window of training micro-images, wherein an individual patch of pixels of the patches of pixels in the window of training micro-images is selected from an individual training micro-image of the window of training micro-images, linearizing the patches of pixels into one-dimensional patches of pixels, and generating the training vector for the training micro-image based on concatenating the one-dimensional patches of pixels, and generating a second set of training vectors by reducing dimensionality of the first set of training vectors, wherein the second set of training vector corresponds to the pre-determined disparity of the subspace.

16. The apparatus as claimed in claim 11, wherein the focused plenoptic camera comprises a multi-focus micro-lens array comprising micro-lenses of one or more lens types, and wherein the apparatus is further caused, at least in part to:

determine the plurality of subspaces by determining one or more subspaces for the one or more lens types for each pre-determined disparity of the set of pre-determined disparities, wherein a subspace of the plurality of subspaces corresponds to a lens type of the one or more lens types and corresponds to a pre-determined disparity of the set of pre-determined disparities, and wherein the subspace is determined by:

facilitating receipt of a set of training images, the set of training images comprising a plurality of training micro-images;

generating a first set of training vectors for the plurality of training micro-images of the set of training images, wherein a training vector of the first set of training vectors associated with a training micro-image of the plurality of training micro-images is determined by:

selecting a window of training micro-images for the training micro-image, the window of training micro-images comprising the training micro-image and a set of neighboring training micro-images of the training micro-image, selecting patches of pixels in the window of training micro-images, wherein an individual patch of pixels of the patches of pixels in the window of training micro-images is selected from an individual training micro-image of the window of training micro-images, linearizing the patches of pixels into one-dimensional patches of pixels, and generating the training vector for the training micro-image based on concatenating the one-dimensional patches of pixels, and generating a second set of training vectors by reducing dimensionality of the first set of training vectors, wherein the second set of training vector corresponds to the pre-determined disparity of the subspace.

17. The apparatus as claimed in claim 12, wherein the individual patch of pixels comprises a length parameter greater than a maximum pre-determined disparity in the set of pre-determined disparities.

18. The apparatus as claimed in claim 15, wherein the second set of training vectors are generated from the first set of training vectors based on applying a principal component analysis of the first set of training vectors.

19. The apparatus as claimed in claim 15, wherein determining the plurality of subspaces further comprises storing the plurality of subspaces in the focused plenoptic camera.

20. The apparatus as claimed in claim 16, wherein the focused plenoptic camera comprises the multi-focus micro-lens array of micro-lenses of the one or more lens types; and wherein the apparatus is further caused to access the plurality of subspaces by accessing the one or more subspaces for the one or more lens types for each pre-determined disparity of the set of pre-determined disparities; and wherein the apparatus is further caused to project the plenoptic vector for the plenoptic micro-image by projecting the plenoptic vector in the one or more subspaces for the one or more lens types for each pre-determined disparity.

21. The apparatus as claimed in claim 11, wherein the focused plenoptic camera comprises a micro-lens array positioned between a main lens and a sensor of the focused plenoptic camera to increase resolution of the plenoptic image.

22. A computer program product comprising at least one non-transitory computer-readable storage medium, the non-transitory computer-readable storage medium comprising a set of instructions, which, when executed by one or more processors, cause an apparatus to at least perform: facilitate receipt of a plenoptic image associated with a scene, the plenoptic image comprising a plurality of plenoptic micro-images and being captured by a focused plenoptic camera; generate a plurality of plenoptic vectors for the plurality of plenoptic micro-images of the plenoptic image, wherein an individual plenoptic vector of the plurality of plenoptic vectors is generated for an individual plenoptic micro-image of the plurality of plenoptic micro-images; and assign disparities for the plurality of plenoptic micro-images of the plenoptic image, wherein a disparity of the disparities for a plenoptic micro-image of the plurality of plenoptic micro-images is assigned at least by: accessing a plurality of subspaces associated with a set of pre-determined disparities, wherein a subspace of the plurality of subspaces is associated with a corresponding pre- determined disparity of the set of pre-determined disparities, projecting a plenoptic vector for the plenoptic micro-image in the plurality of subspaces associated with the set of pre-determined disparities, calculating a plurality of residual errors based on projections of the plenoptic vector in the plurality of subspaces, and determining the disparity for the plenoptic micro-image based on a comparison of the plurality of residual errors.

* * * * *